(12) United States Patent
McMahon et al.

(10) Patent No.: US 12,277,479 B2
(45) Date of Patent: Apr. 15, 2025

(54) HARDWARE DESIGNS FOR PHOTONICS QUANTUM DATA LOADERS

(71) Applicant: QC Ware Corp., Palo Alto, CA (US)

(72) Inventors: Peter L. McMahon, Ithaca, NY (US); Iordanis Kerenidis, Paris (FR)

(73) Assignee: QC Ware Corp., Palo Alto, CA (US)

( * ) Notice: Subject to any disclaimer, the term of this patent is extended or adjusted under 35 U.S.C. 154(b) by 807 days.

(21) Appl. No.: 17/534,140

(22) Filed: Nov. 23, 2021

(65) Prior Publication Data

US 2022/0083895 A1 Mar. 17, 2022

Related U.S. Application Data

(63) Continuation-in-part of application No. 16/986,553, filed on Aug. 6, 2020, now Pat. No. 11,681,939, and a continuation-in-part of application No. 16/987,235, filed on Aug. 6, 2020, now Pat. No. 11,687,816.

(60) Provisional application No. 63/117,384, filed on Nov. 23, 2020, provisional application No. 63/007,325, filed on Apr. 8, 2020.

(51) Int. Cl.
G06N 10/40 (2022.01)

(52) U.S. Cl.
CPC .................... G06N 10/40 (2022.01)

(58) Field of Classification Search
CPC .............................. G06N 10/40; G06N 3/084
See application file for complete search history.

(56) References Cited

U.S. PATENT DOCUMENTS

| | | | |
|---|---|---|---|
| 10,540,604 B1* | 1/2020 | Papageorge | G06F 13/4068 |
| 11,170,318 B2* | 11/2021 | Ashrafi | G02F 3/00 |
| 2003/0011398 A1* | 1/2003 | Herr | H03K 19/1954 326/3 |
| 2004/0252732 A1* | 12/2004 | Ralph | H04L 9/0858 257/27 |
| 2013/0246495 A1* | 9/2013 | Svore | G06N 10/60 708/491 |
| 2013/0308956 A1 | 11/2013 | Meyers et al. | |
| 2014/0280427 A1* | 9/2014 | Bocharov | B82Y 10/00 708/200 |

FOREIGN PATENT DOCUMENTS

| | | |
|---|---|---|
| JP | 2006-195558 A | 7/2006 |
| WO | WO 2019/204282 A1 | 10/2019 |
| WO | WO 2020/010208 A1 | 1/2020 |

OTHER PUBLICATIONS

Gaurav Gautam et al., "A controllable single photon beam-splitter as a node of a quantum network", Jun. 16, 2015, pp. 1-24 (Year: 2015).*

Barz, S., "Quantum computing with photons: introduction to the circuit model, the one-way quantum computer, and the fundamental principles of photonic experiments," Journal of Physics B: Atomic, Molecular and Optical Physics, vol. 48, Mar. 20, 2015, pp. 1-25.

(Continued)

*Primary Examiner* — Jared M Bibbee
(74) *Attorney, Agent, or Firm* — Fenwick & West LLP

(57) ABSTRACT

This disclosure relates generally to circuit-model quantum computation, and more particularly, to quantum processing devices that are specialized for efficient loading of classical data into a quantum computer.

18 Claims, 21 Drawing Sheets

(56) References Cited

OTHER PUBLICATIONS

Bouland, A. et al., "Prospects and challenges of quantum finance," arXiv:2011.06492v1, Nov. 12, 2020, pp. 1-49.
Huggins, W. et al., "Towards quantum machine learning with tensor networks", Quantum Sci. Technol., vol. 4, Jan. 9, 2019, pp. 1-16.
Khalid, A.U. et al., "FPGA emulation of quantum circuits", IEEE International Conference on Computer Design: VLSI in Computers and Processors, Nov. 8, 2004, pp. 1-6.
PCT International Search Report and Written Opinion, PCT Application No. PCT/US2021/060614, Sep. 20, 2022, 16 pages.
Ramos-Calderer, S. et al., "Quantum unary approach to option pricing," arXiv:1912.01618v3, Jul. 29, 2020, pp. 1-26.
United States Office Action, U.S. Appl. No. 16/986,553, filed Oct. 14, 2022, eight pages.
United States Office Action, U.S. Appl. No. 16/987,235, filed Oct. 27, 2022, 12 pages.
Wikipedia, "Beam splitter," Dec. 1, 2016, pp. 1-5, [Online] [Retrieved on Oct. 23, 2017] Retrieved from the Internet <URL: https://en.wikipedia.org/w/index.php?title=Beam_splitter&oldid=752554574>.
Bravyi, S. et al., "Hadamard-free circuits expose the structure of the Clifford group," arXiv:2003.09412, Mar. 20, 2020, pp. 1-34.
Foxen, B. et al., "Demonstrating a Continuous Set of Two-qubit Gates for Near-term Quantum Algorithms," arXiv:2001.08343v2, Feb. 3, 2020, pp. 1-20.
Ostaszewski, M. et al., "Quantum Circuit Structure Learning" arXic:1905.09692v2, Oct. 4, 2019, pp. 1-11.
Pai, D. et al., "Parallel fault-tolerant programming of an arbitrary feedforward photonic network," arXiv:1909.06179, Sep. 11, 2019, pp. 1-15.
PCT International Search Report and Written Opinion, PCT Application No. PCT/US21/22548, Jul. 28, 2021, 21 pages.
PCT Invitation to Pav, PCT Application No. PCT/US21/22548, May 27, 2021, two pages.
Gard, B.T. et al., "An introduction to boson-sampling," arXiv:1406.6767, Jun. 26, 2014, pp. 1-13.
Mirhosseini, M. et al., "Superconducting qubit to optical photon transduction," Nature, vol. 588, Dec. 23, 2020, pp. 599-603.
European Patent Office, Extended European Search Report and Written Opinion, European Patent Application No. 21783956.2, Mar. 20, 2024, 9 pages.
Giovannetti, V. et al. "Quantum random access memory," Physical Review Letters, vol. 100, No. 16, Apr. 21, 2008, 4 pages.
Johri, S. et al. "Nearest centroid classification on a trapped ion quantum computer," npj Quantum Information, vol. 7, No. 1, Aug. 4, 2021, 11 pages.
Plesch, M. et al. "Quantum-state preparation with universal gate decompositions," Physical Review A, vol. 83, No. 3, Mar. 3, 2011, 5 pages.
Sun, X. et al. "Asymptotically optimal circuit depth for quantum state preparation and general unitary synthesis," IEEE Transactions on Computer-Aided Design of Integrated Circuits and Systems, Feb. 14, 2023, 41 pages.

\* cited by examiner

Time Step 0

Time Step 1

Time Step 2

FIG. 5D  Time Step 3
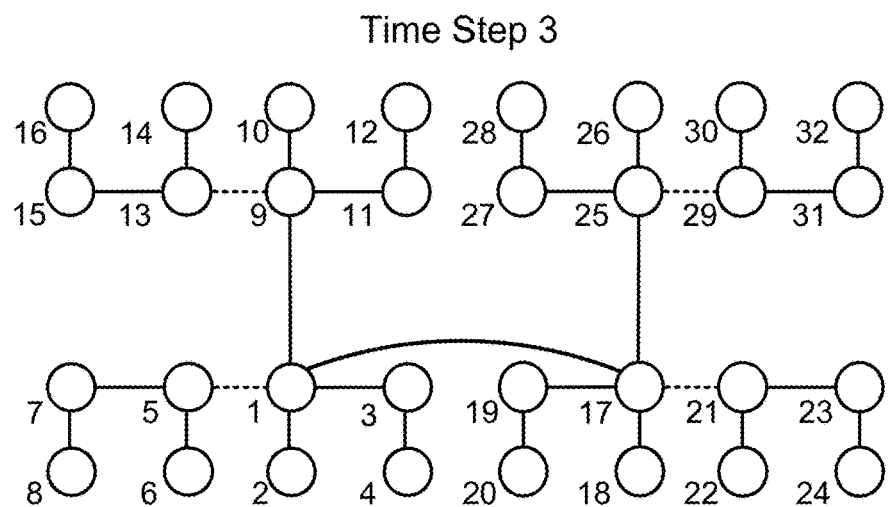
FIG. 5E  Time Step 4
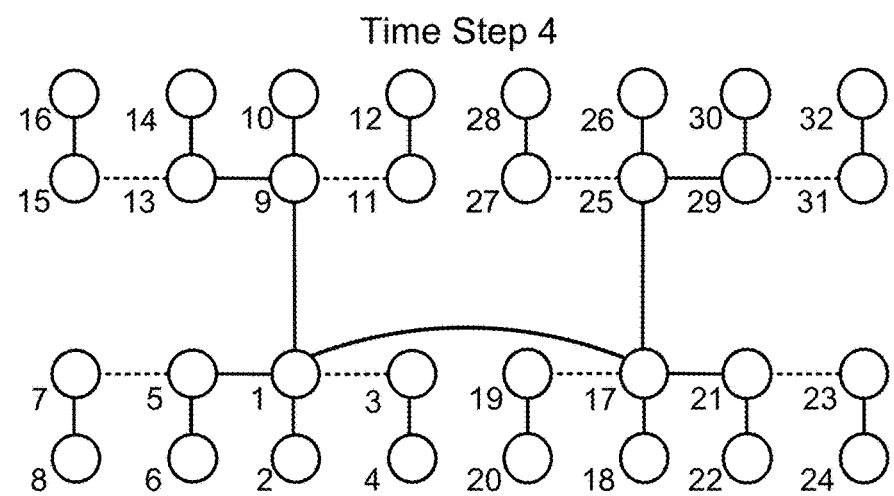
FIG. 5F  Time Step 5
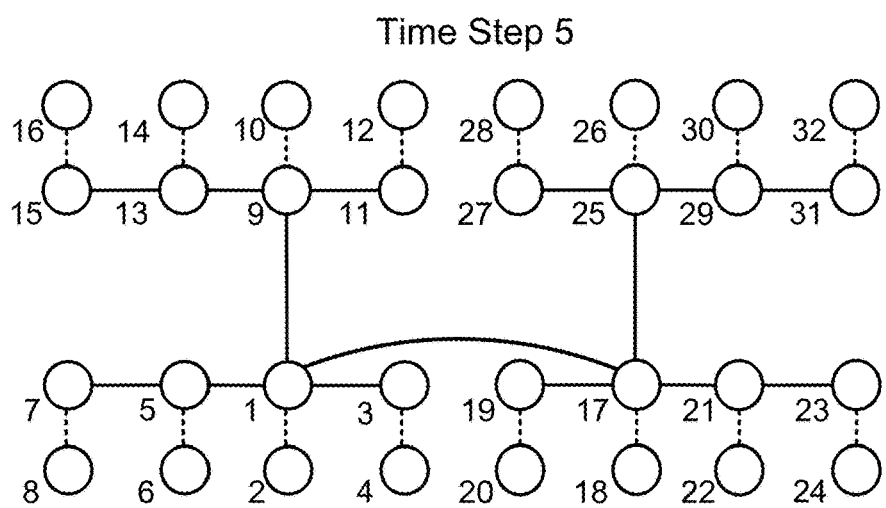

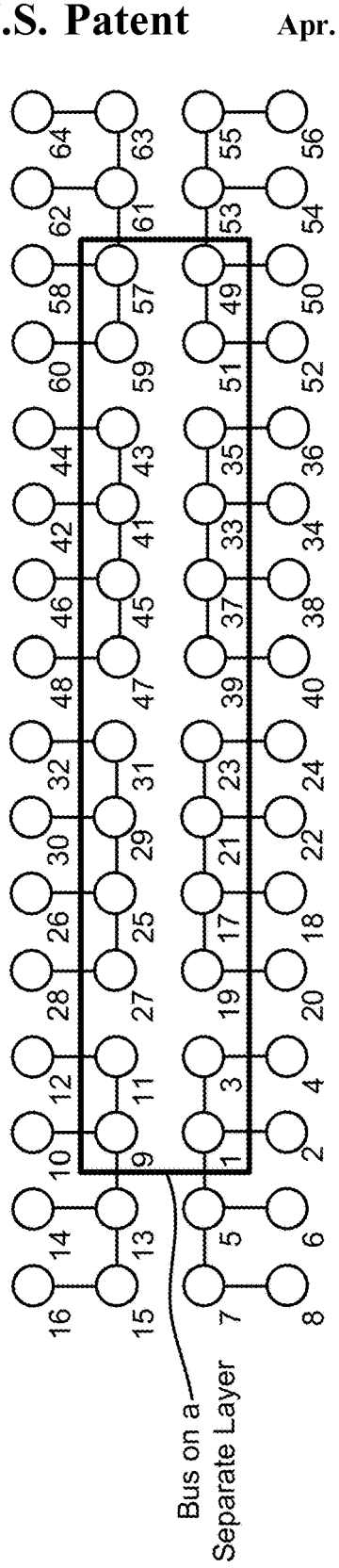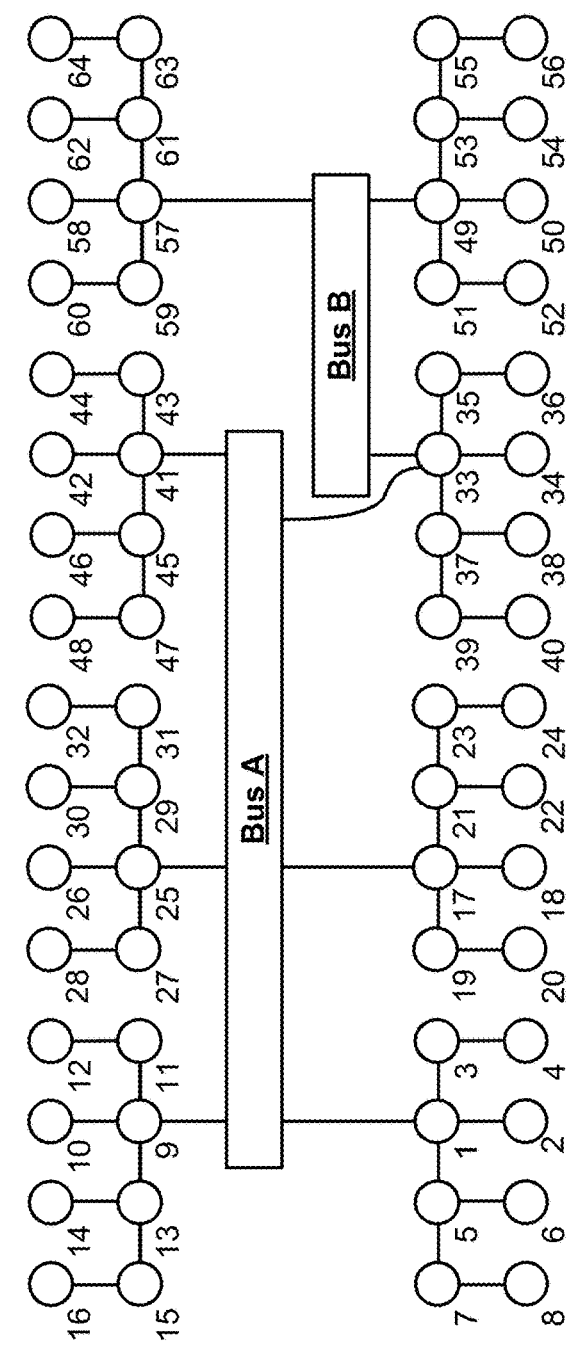
FIG. 9
FIG. 10

HARDWARE DESIGNS FOR PHOTONICS QUANTUM DATA LOADERS

CROSS-REFERENCE TO RELATED APPLICATIONS

This application is a continuation-in-part of U.S. patent application Ser. No. 16/986,553 "Quantum Data Loader," filed on Aug. 6, 2020 which claims priority under 35 U.S.C. § 119(e) to U.S. Provisional Patent Application 63/007,325, "Quantum Data Loader," filed on Apr. 8, 2020. This application is a continuation-in-part of U.S. patent application Ser. No. 16/987,235 "Quantum Data Loader," filed on Aug. 6, 2020 which claims priority under 35 U.S.C. § 119(e) to U.S. Provisional Patent Application Ser. No. 63/007,325, "Quantum Data Loader," filed on Apr. 8, 2020. This application claims priority under 35 U.S.C. § 119(e) to U.S. Provisional Patent Application 63/117,384, "Hardware Designs for Quantum Data Loaders," filed on Nov. 23, 2020. The subject matter of all of the foregoing is incorporated herein by reference in their entirety.

BACKGROUND

1. Technical Field

This disclosure relates generally to circuit-model quantum computation, and more particularly, to quantum processing devices that are specialized for efficient loading of classical data into a quantum computer. This disclosure also relates to the field of quantum algorithms and quantum data loading, and more particularly to constructing quantum circuits for loading classical data into quantum states which reduces the computational resources of the circuit, e.g., number of qubits, depth of quantum circuit, and type of gates in the circuit.

2. Description of Related Art

Many quantum machine learning and optimization algorithms load classical data into quantum states in order to use quantum procedures for tasks like classification, clustering, or solving linear systems. This makes these algorithms not near-term, since the proposals for such loaders, also called Quantum Random Access Memory (QRAM), are large and complex circuits both in the number of qubits and the depth of the quantum circuit. For example, conventional QRAM circuits have depths of O(n) where n is the dimension of a vector that represents a classical data point.

SUMMARY

Some embodiments relate to a quantum data loader configured to encode an n-dimensional vector representing classical data into a quantum state. The quantum data loader includes n qubits and connections connecting pairs of qubits according to a tree pattern. The number of connections may be n−1. Each connection allows a quantum gate operation to be performed on a pair of qubits. The connections include adjacent connections connecting adjacent qubits. The connections also include one or more non-adjacent connections connecting non-adjacent qubits. The connections may be arranged so that the data loader can execute a data loader quantum circuit.

In some embodiments, groups of the n qubits are connected by adjacent connections according to a binary tree pattern. A non-adjacent connection may connect a first group to a second group. Groups may include eight or fewer qubits.

The n qubits may be arranged in a two-dimensional plane or arranged in a grid pattern. In some embodiments, the n qubits are arranged so that the number of non-adjacent connections is minimized. The number of qubits may be a power of two and greater than 16 (e.g., a data loader with 16 qubits arranged in a 2D 4×4 grid may not have a non-adjacent connection).

A non-adjacent connection may include one or more ancilla qubits or a bus that connects a first qubit to a second qubit. In some embodiments, the non-adjacent connection includes multiple buses. For example, a first bus connects a first qubit to a second qubit and a second bus connects a third qubit to the first qubit or the second qubit. A bus may be located on a different layer than a layer that the n qubits are located on.

If the qubits are semiconductor quantum dot spin qubits, the non-adjacent connection may include a metal wire that connects a first semiconductor quantum dot spin qubit to a second semiconductor quantum dot spin qubit. If the qubits are trapped-ion qubits, the non-adjacent connection may include an ion-shuttling path module that connects a first trapped-ion qubit to a second trapped-ion qubit, where the shuttling path module is configured to physically move the first trapped-ion qubit along a shuttling path to be adjacent to the second trapped-ion qubit.

In some embodiments, the n qubits are superconducting-circuit qubits, and the quantum data loader is coupled to a quantum processing unit comprising a set of qubits different than then qubits in the quantum data loader. In some embodiments, the set of qubits of the quantum processing unit are not superconducting-circuit qubits. For example, the set of qubits of the quantum processing unit are trapped-ion qubits, neutral-atom qubits, or semiconductor-spin qubits.

In some embodiments, the n qubits are semiconductor-spin qubits, and the quantum data loader is coupled to a quantum processing unit comprising a set of qubits different than the n qubits in the quantum data loader. In some embodiments, the set of qubits of the quantum processing unit are not superconducting-circuit qubits. For example, the set of qubits of the quantum processing unit are superconducting-circuit qubits, trapped-ion qubits, or neutral-atom qubits.

Some embodiments relate to a quantum data loader configured to encode an n-dimensional vector representing classical data into a quantum state. The quantum data loader includes (e.g., n−1) tunable beam splitters coupled together according to a binary tree pattern. Each beam splitter has a tunable parameter that affects a ratio of reflectance versus transmittance. The quantum data loader also includes a single photon source coupled to a root node tunable beam splitter (e.g., the root node beam splitter is the only beam splitter that the source is coupled to). The photon source is configured to inject a photon into the root node tunable beam splitter. The photon source may be a heralded single-photon source.

The tunable parameters may be tuned based on the n-dimensional vector so that an output quantum state of the quantum data loader encodes the n-dimensional vector representing the classical data.

A tunable beam splitter of the n−1 tunable beam splitters may be configured to implement a BS quantum gate, where the BS quantum gate is a parametrized two-qubit gate. The tunable parameter value of the tunable beam splitter corresponds to the parameter of the two-qubit gate.

In some embodiments, the binary tree pattern comprises: the root node tunable beam splitter comprising a first output port and a second output port; a second tunable beam splitter with an input port coupled to the first output port of the root node tunable beam splitter; a third tunable beam splitter with an input port coupled to the second output port of the root node tunable beam splitter; a fourth tunable beam splitter with an input port coupled to a first output port of the second tunable beam splitter; and a fifth tunable beam splitter with an input port coupled to a second output port of the second tunable beam splitter. The binary tree pattern may include additional beam splitters that continue the above pattern (e.g., to form a perfect binary tree pattern).

In some embodiments, one or more of the tunable beam splitters are Zehnder-Interferometers. A Zehnder-Interferometer includes two fixed-ratio beam splitters and a tunable phase shifter. The phase shifter may be a thermo-optic-mechanical-system phase shifter, a micro-electro-mechanical-system (MEMS) phase shifter, or an electro-optic phase shifter. A Zehnder-Interferometer may further include a phase controller.

The quantum data loader may be coupled to a quantum processing unit comprising a set of qubits. In some embodiments, the quantum processing unit does not include tunable beam splitters. For example, the set of qubits of the quantum processing unit includes superconducting-circuit qubits, trapped-ion qubits, or neutral-atom qubits. The quantum data loader may be coupled to the quantum processing unit via a conversion stage. The conversion stage may include fiber optic cables that couple one or more of the n−1 tunable beam splitters to a conversion interface of the quantum processing unit. The conversion interface may include optical-to-microwave converters.

In some embodiments, the quantum data loader is coupled to a second quantum data loader. The second quantum data loader may include n−1 tunable beam splitters coupled together according to a reverse binary tree pattern. In some embodiments, a subset of output ports of beam splitters in the binary tree pattern are coupled to a subset of input ports of beam splitters in the reverse binary tree pattern.

Some embodiments relate to a hardware design for a quantum data loader (QDL) where the qubits are restricted to existing on a two-dimensional plane, and the qubits are laid out on the plane such that the number of long-range interactions is minimized. Interactions (e.g., gate operations) between non-adjacent qubits on the plane may be mediated by chains of copies of the non-adjacent qubits. Interactions between non-adjacent on the plane may be mediated by a bus. The bus may be fabricated in a chip layer above or below the layer of qubits. Multiple buses may be used to avoid frequency crowding. Interactions between non-adjacent qubits on the plane may be mediated by pairwise mechanisms, such as ion shuttling or wires.

Some embodiments relate a quantum data loader with on-chip photonic qubits, where the interactions are mediated by on-chip photonic beamsplitters. The on-chip photonic beamsplitters may be realized using Mach-Zehnder Interferometers. The data loader may include a single-photon source generating a heralded photonic qubit. This may result in the quantum data loader outputting a signal confirming when it successfully loads classical data (or not).

Some embodiments relate to a hardware design for a special-purpose quantum computer that performs vector-vector dot products on (e.g., large) classical vectors by combining two quantum data loaders (e.g., data loaders with photonic qubits).

Some embodiments relate to a quantum data loader coupled to another quantum processing device (e.g., a universal quantum processing device). The additional quantum processing device is configured to process the loaded classical data from the data loader. The additional quantum processing device may be constructed from different physical qubits than the quantum data loader. For example, the quantum data loader includes photonic qubits, and the additional quantum processing device includes superconducting-circuit qubits.

Other aspects include components, devices, systems, improvements, methods, processes, applications, non-transitory computer readable mediums, and other technologies related to any of the above.

BRIEF DESCRIPTION OF THE DRAWINGS

Embodiments of the disclosure have other advantages and features which will be more readily apparent from the following detailed description and the appended claims, when taken in conjunction with the examples in the accompanying drawings, in which:

FIG. 1A is a diagram showing a quantum circuit used for loading classical data into a quantum state, using a single parametrized two-qubit gate (referred to as "BS"), according to an embodiment.

FIG. 1B is a diagram showing a quantum circuit used for loading classical data into a quantum state, using a single parametrized two-qubit gate and its controlled version (referred to as "c-BS"), according to a different embodiment.

FIG. 2 is a diagram showing one way of applying the quantum data loader circuit to estimating the distance (or equivalently the inner product) between two data points, according to an embodiment.

FIG. 3 is a diagram showing one way of applying the quantum data loader circuit to estimating the distance (or equivalently the inner product) between two data points, according to another embodiment.

FIGS. 5A-5F illustrate the quantum data loader in FIG. 4 executing a 32-qubit data loader circuit at various time steps, according to some embodiments.

FIG. 9 illustrates a 64-qubit quantum data loader in which a bus mediates long-range interactions, and in which the bus is fabricated on a different layer than the qubits, allowing it to be placed (e.g., directly) above or below the qubits to mediate interactions between them, according to an embodiment.

FIG. 10 illustrates a 64-qubit quantum data loader in which two buses are used to mediate the long-range interactions (Bus A mediating the interactions between Qubits 1 and 33, 1 and 17, 1 and 9, 17 and 25, 33 and 41; Bus B mediating the interactions between 33 and 49, 49 and 57), according to an embodiment. By using multiple buses, frequency crowding can be reduced or avoided.

FIG. 12C illustrates a photonic-chip implementation of an 8-qubit quantum data loader, according to an embodiment.

Figure 4:
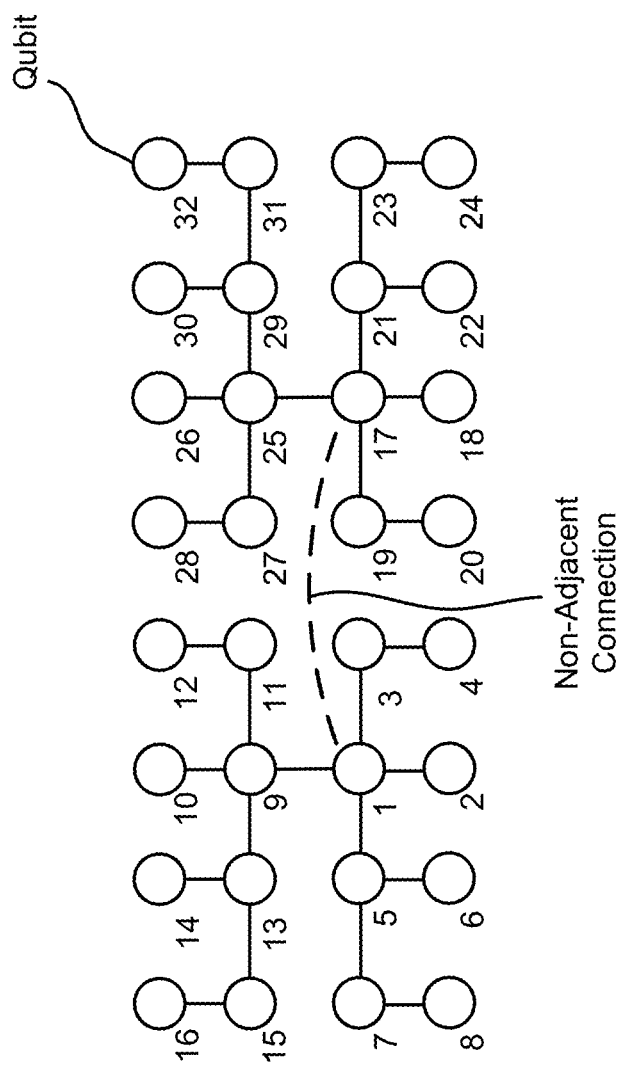
FIG. 4 illustrates two-qubit-gate connections for a 32-qubit quantum data loader, according to an embodiment.
Figure 5A:
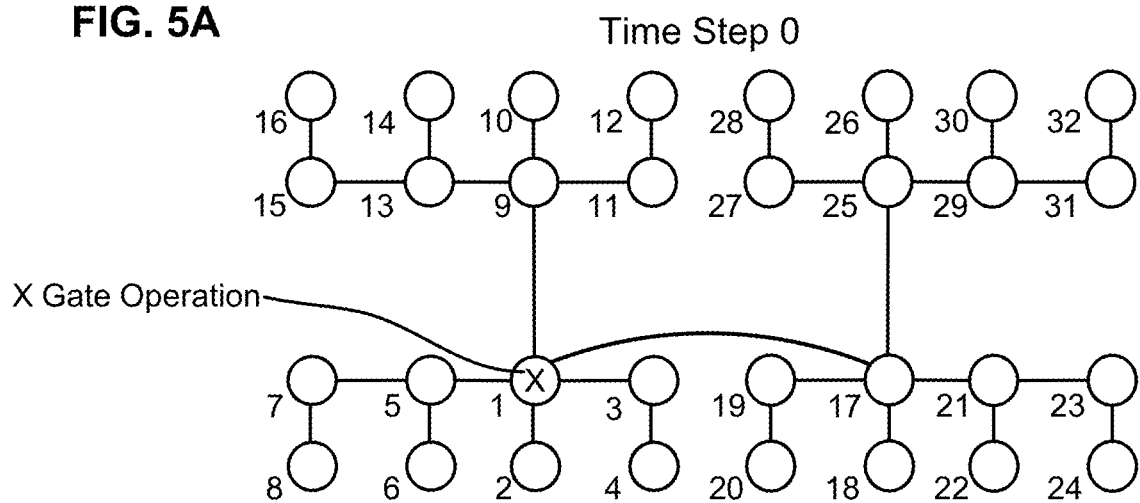
Figure 5B:
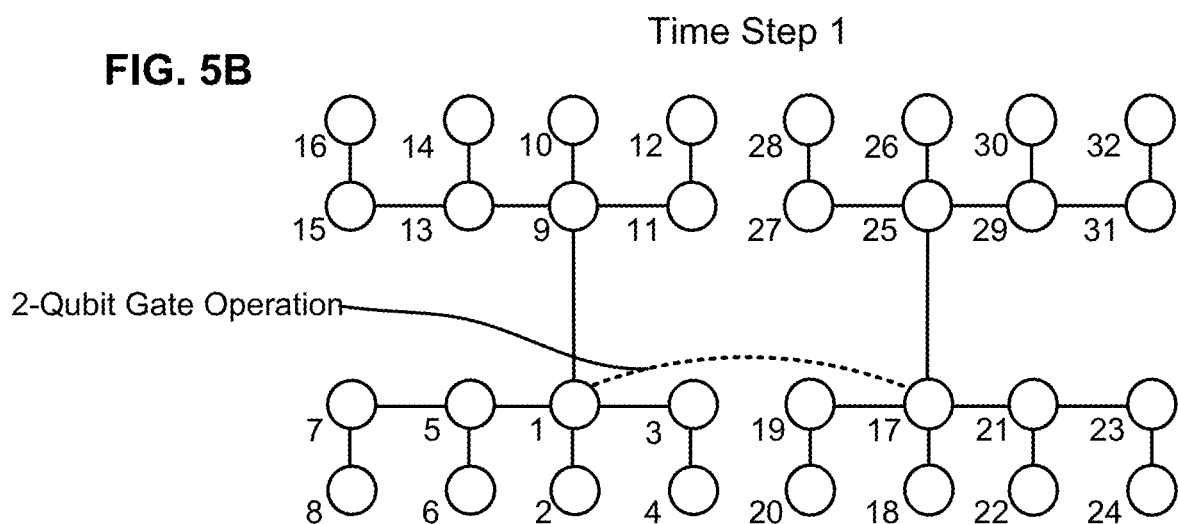
Figure 5C:
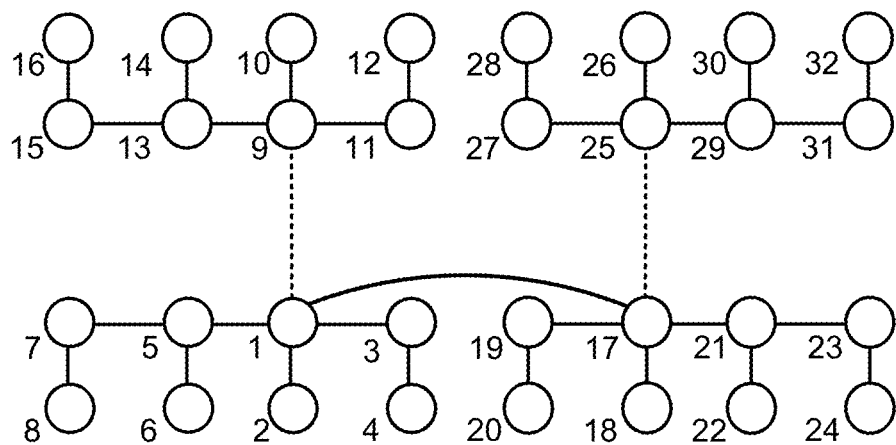

The figures depict various embodiments for purposes of illustration only. One skilled in the art will readily recognize from the following discussion that alternative embodiments of the structures and methods illustrated herein may be employed without departing from the principles described herein, for example, by changing the specifics of the BS gate.

DETAILED DESCRIPTION

The figures and the following description relate to preferred embodiments by way of illustration only. It should be noted that from the following discussion, alternative embodiments of the structures and methods disclosed herein will be readily recognized as viable alternatives that may be employed without departing from the principles of what is claimed.

Here we describe a new circuit construction for loading classical data on quantum computers that can reduce both the number of qubits and the depth of the quantum circuit.
Part 1: Methods for Loading Classical Data into Quantum States In one aspect, a classical data point is represented by an n-dimensional vector $(x_1, x_2, \ldots, x_n)$ where $x_i$ is a real number and the Euclidean norm of the vector is 1. For clarity of presentation of this particular aspect, we will assume that n is a power of 2, but our methods can extend to the general case.

From the classical data point $(x_1, x_2, \ldots, x_n)$, we will describe a specific implementation of a circuit that can efficiently create the quantum state that encodes this classical data, namely create the state $$\Sigma_{i=1}^{n} x_i |e_i\rangle \quad (1)$$

where $e_i$ is the unary (i.e., one-hot) representation of i. Other equivalent circuits of the same family can also be constructed.

The first step is to compute classically a set of angles $(\theta_1, \theta_2, \ldots, \theta_{n-1})$, from the classical data point $(x_1, x_2, \ldots, x_n)$. In one aspect, the angles are computed in the following way:

First, we compute an intermediate series $(r_1, r_2, \ldots, r_{n-1})$ that will help us in the calculations in the following way. We start by defining the last n/2 values $(r_{n/2}, \ldots, r_{n-1})$. To do so, we define an index j that takes values in the interval [1, n/2] and define the values $$r_{\frac{n}{2}+j-1}$$

as $$r_{\frac{n}{2}+j-1} = \sqrt{x_{2j}^2 + x_{2j-1}^2} \quad (2)$$

Note that for j=1, we get the definition of $r_{n/2}$, for j=2 we get the definition of $r_{n/2+1}$, all the way to j=n/2, where we get the definition of $r_{n-1}$.

For the first n/2-1 values, namely the values of $(r_1, r_2, \ldots, r_{n/2-1})$, we define again and index j that takes values in the interval [1,n/2] and define the values as $$r_j = \sqrt{r_{2j+1}^2 + r_{2j}^2} \quad (3)$$

We can now define the set of angles $(\theta_1, \theta_2, \ldots, \theta_{n-1})$ in the following way. We start by defining the last n/2 values $(\theta_{n/2}, \ldots, \theta_{n-1})$. To do so, we define an index j that takes values in the interval [1, n/2] and define the values $$\theta_{\frac{n}{2}+j-1}$$

as $$\theta_{\frac{n}{2}+j-1} = \arccos\left(\frac{x_{2j-1}}{r_{\frac{n}{2}+j-1}}\right), \text{ if } x_{2j} \text{ is positive and} \quad (4)$$

$$\theta_{\frac{n}{2}+j-1} = 2\pi - \arccos\left(\frac{x_{2j-1}}{r_{\frac{n}{2}+j-1}}\right), \text{ if } x_{2j} \text{ is negative} \quad (5)$$

For the first n/2-1 values, namely the values of $(\theta_1, \theta_2, \ldots, \theta_{n/2-1})$, we define again and index j that takes values in the interval [1,n/2] and define the values as $$\theta_j = \arccos\left(\frac{r_{2j}}{r_j}\right) \quad (6)$$

Similar ways of defining the values of the angles are possible and fall into the same method as ours.

We can now define two different quantum circuits for loading the classical data point $(x_1, x_2, \ldots, x_n)$ into the quantum state $\Sigma_{i=1}^{n} x_i |e_i\rangle$. We will use one type of parametrized two-qubit gate that we call BS($\theta$) and has the following description:

BS($\theta$)=[[1,0,0,0],[0, cos($\theta$), sin($\theta$),0],[0,−sin($\theta$), cos($\theta$),0],[0,0,0,1]] (7)

Note that one can use other similar gates that are derived by permuting the rows and columns of the above matrix, or by introducing a phase element $e^{i\varphi}$ instead of the "1" at matrix position (4,4), or by changing the two elements sin($\theta$) and −sin(θ) to for example i*sin(θ) and i*sin(θ). All these gates are practically equivalent and our method can use any of them. Here are some specific examples of alternative gates, however, this list is not exhaustive:

$$BS_1(\theta)=[[1,0,0,0],[0, \cos(\theta),-i*\sin(\theta),0],[0,-i*\sin(\theta),\cos(\theta),0],[0,0,0,1]] \quad (8)$$

$$BS_2(\theta)=[[1,0,0,0],[0, \cos(\theta), \sin(\theta),0],[0, \sin(\theta),-\cos(\theta),0],[0,0,0,1]] \quad (9)$$

$$BS_3(\theta,\varphi)=[[1,0,0,0],[0, \cos(\theta),-i*\sin(\theta),0],[0,-i*\sin(\theta), \cos(\theta),0],[0,0,0,e^{-i\varphi}]] \quad (10)$$

$$BS_4(\theta,\varphi)=[[1,0,0,0],[0, \cos(\theta), \sin(\theta),0],[0,-\sin(\theta), \cos(\theta),0],[0,0,0,e^{-i\varphi}]] \quad (11)$$

We will also use an X gate in the circuit which may be defined as X=[[0, 1], [1, 0]].

In some cases, we will also use a controlled version of the gate BS(θ) which we call c-BS(θ). Similar to other control gates, this gate is defined as:

$$c\text{-}BS(\theta)=|0\rangle\langle 0|\beta Id+|1\rangle\langle 1|\beta BS(\theta) \quad (12)$$

In other words, this is a three-qubit gate where if the first qubit (called control qubit) is in the state $|0\rangle$, then the Identity matrix (Id) is applied in the second and third qubits (target qubits), and if the first qubit is $|1\rangle$ then the gate BS(θ) is applied in the second and third qubits.

An example method for constructing the circuit is the following, we will denote it as the "parallel" loader circuit. We start with all qubits initialized to the 0 state. In the first step, we apply an X gate on the first qubit. Then, the circuit is constructed by adding BS gates in layers, using the angles θ we have constructed before. The first layer has 1 BS gate, the second layer has 2 BS gates, the third layer has 4 BS gates, until the log n-th layer that has n/2 gates. The total number of BS gates is n−1, exactly the same number of angles θ we have computed before. The qubits to which the gates are added follow a tree structure (e.g., a binary tree structure). In the first layer we have one BS gate between qubits (0,n/2) with angle $\theta_1$, in the second layer we have two BS gates between (0,n/4) with angle $\theta_2$ and (n/2,3n/4) with angle $\theta_3$, in the third layer there are four BS gates between qubits (0,n/8) with angle $\theta_4$, (n/4,3n/8) with angle $\theta_5$, (n/2,5n/8) with angle $\theta_6$, (3n/4,7n/8) with angle $\theta_7$, and so forth for the other layers.

Figure 1A:
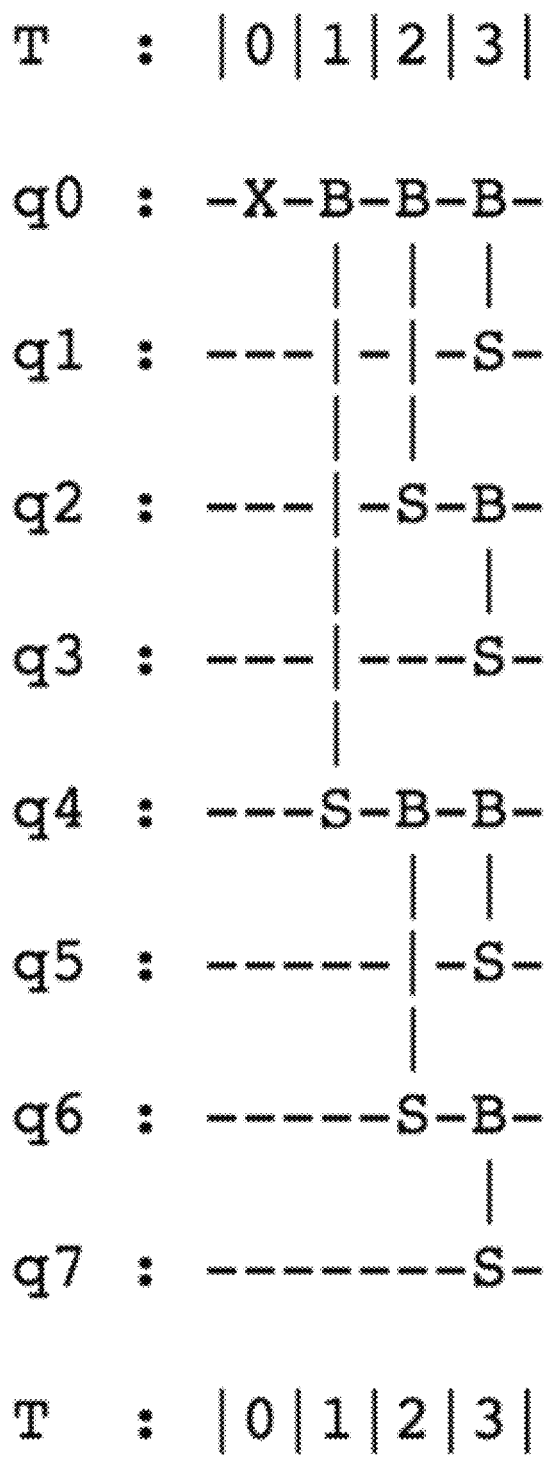

FIG. 1A provides one specific implementation of our method for loading an 8-dimensional data point ($x_1$, $x_2$, . . . , $x_8$). In FIG. 1A, T is the time step, q0-q7 are the qubits, X is an X gate, and the vertical lines indicate which qubits the BS gates are applied to. Similar notation is used for FIGS. 1B-3. In FIG. 1A, an X gate is applied to qubit q0 in a first layer and subsequent layers apply BS gates according to a binary tree pattern where the root node of the tree is q0. A binary tree pattern is a pattern in which each node has at most two children and depth describes the distance from the root node (the root node has a depth of 0). The gates BS in FIG. 1A going from left to right and from top to bottom have as parameters the angles ($\theta_1, \theta_2, \ldots, \theta_7$) as can be calculated from our description above or similarly. The number of qubits used for the quantum circuit, the depth of the circuit and the number of two-qubit and three-qubit gates are given below for different dimensions and in the general case:

For dimension 8: qubits=8; depth=4; number of two-qubit gates=7; 3-qubit gates=0.

Dimension 1024: qubits=1024; depth=11; two-qubit gates=1023; 3-qubit gates=0.

Dimension n: qubits=n; depth=log(n)+1; 2-qubit gates=n−1; 3-qubit gates=0.

Since the depth of a circuit may correspond to the running time or time complexity of the circuit, the vector may be converted to a quantum state in ~O(log(n)).

The following is a description of an example quantum circuit for the parallel loader circuit: a quantum circuit is formed for use in encoding an n-dimensional vector representing classical data into quantum states for n qubits. The quantum circuit includes n qubits, a first layer comprising an X gate applied to one of the qubits, and a plurality of subsequent layers. The plurality of subsequent layers applies BS gates to the qubits according to a binary tree pattern, where each BS gate is a single parametrized 2-qubit gate and the number of subsequent layers is not more than ceiling ($\log_2$ (n)). In some embodiments, this quantum circuit is a portion of a larger quantum circuit that includes additional layers.

A second example method for constructing the circuit is the following, that we denote as the "second" loader circuit. We assume that ($x_1, x_2, \ldots, x_n$) is such that n is a power of 4, in other words $\sqrt{n}$ is a power of 2. We will use two sets of qubits of size $\sqrt{n}$ each. We start with all qubits initialized to the 0 state. We first apply an X gate on the first and middle qubit. Then, we apply the parallel loader circuit from the previous construction on the first $\sqrt{n}$ qubits with the first $\sqrt{n}$ angles. The circuit is constructed by adding BS gates in layers on the first $\sqrt{n}$ qubits, using the first $\sqrt{n}$ angles θ we have constructed before. The first layer has 1 BS gate, the second layer has 2 BS gates, the third layer has 4 BS gates, until the log $\sqrt{n}$-th layer that has $\sqrt{n}$/2 gates. Then we use each one of the first $\sqrt{n}$ qubits as a control qubit to apply sequentially a controlled version of the parallel loader circuit using the second group of $\sqrt{n}$ qubits as target qubits. To apply the controlled version of the parallel loader circuit we apply the controlled version of each BS(θ) gate.

For the second loader circuit, the total number of BS gates is $\sqrt{n}$−1, and the total number of c-BS gates is $\sqrt{n}(\sqrt{n}−1)$, for a total number of gates equal to n−1 (not including the X gate), exactly the same number of angles θ computed before. The qubits to which the gates are added follow the same tree structures as in the parallel loader circuit. The first tree is applied on the first $\sqrt{n}$ qubits, and then there are $\sqrt{n}$ more tree structures that are all applied on the second $\sqrt{n}$ qubits sequentially, each time controlled with one of the qubits from the first $\sqrt{n}$ ones.

The above construction can also be made to work when n is not a power of 4 and also when we have two sets of qubits not of equal size as before, but, for example, of sizes t and n/t (note that the product still equals n).

Figure 1B:
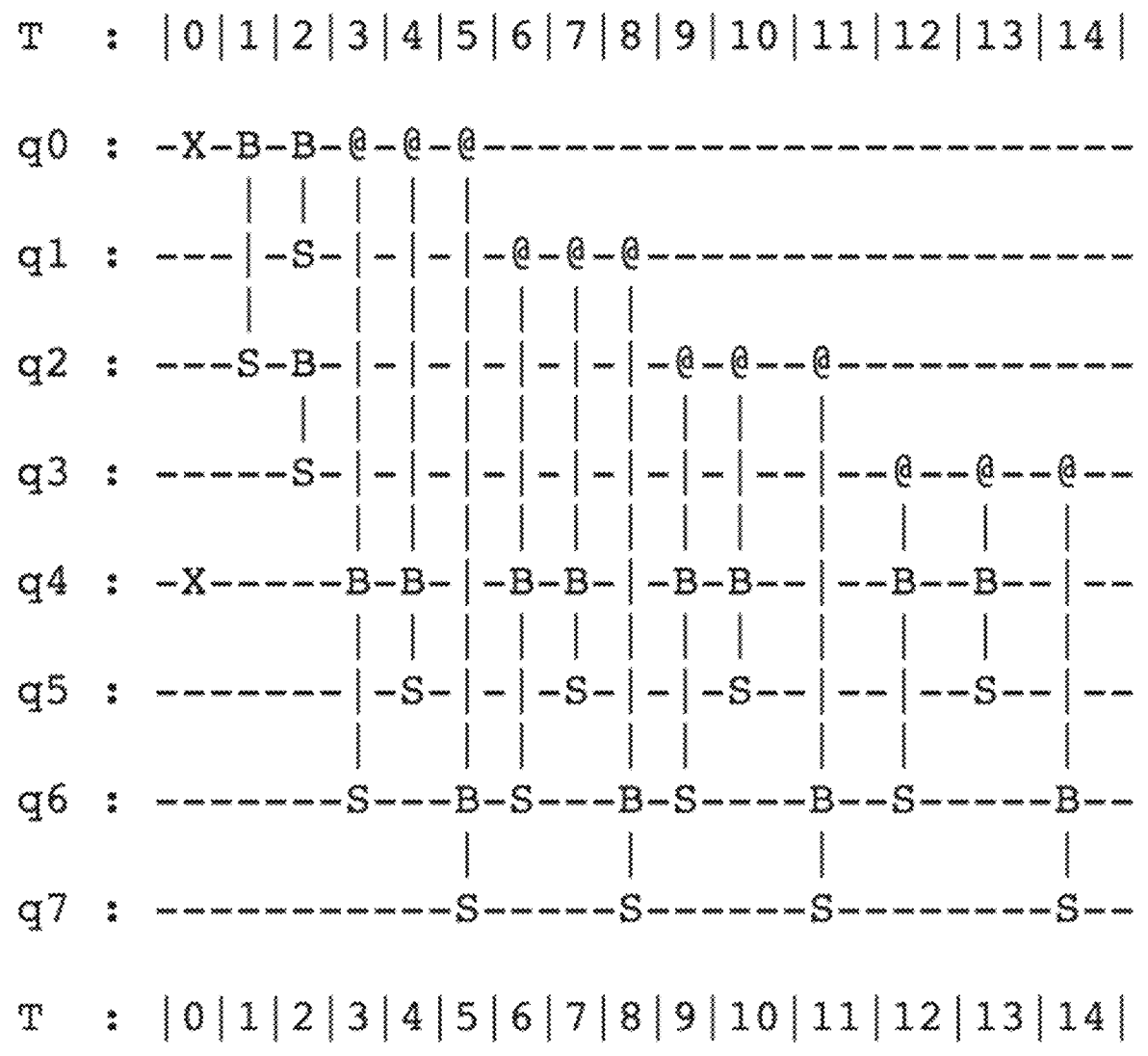

FIG. 1B provides one example implementation of our method for loading a 16-dimensional data point ($x_1$, $x_2, \ldots, x_{16}$).

The gates BS and c-BS in FIG. 1B going from left to right and from top to bottom have parameters the angles ($\theta_1, \theta_2, \ldots, \theta_{15}$) as can be calculated from our description above or similarly. Note that "@" indicates the control qubit for each c-BS gate.

The depth of the circuit in FIG. 1B can be improved by noticing that many gates are applied on different qubits (for example gates on times 4 and 8, or 5 and 7, etc.) and thus can be re-arranged so that the circuit will have a total depth of O($\sqrt{n}$ log n).

The number of qubits used for the quantum circuit, the depth of the circuit, and the number of two-qubit and three-qubit gates are given below in the general case:

Dimension n: qubits=$2\sqrt{n}$; depth=$O(\sqrt{n} \log(n))$; 2-qubit gates=$\sqrt{n}-1$; 3-qubit gates=$\sqrt{n}(\sqrt{n}-1)$; total number of 2- and 3-qubit gates: n−1.

Since the depth of a circuit may correspond to the running time or time complexity of the circuit, the vector may be converted to a quantum state in $\sim O(\sqrt{n} \log n)$ using only $2\sqrt{n}$ qubits.

The following is a description of an example quantum circuit for the second loader circuit: a quantum circuit is formed for use in encoding an n-dimensional vector representing classical data into quantum states. The quantum circuit includes a first group of $\sqrt{n}$ qubits, a second group of $\sqrt{n}$ qubits, a first layer comprising a first X gate applied to a qubit in the first group, a second X gate applied to a qubit in the second group, a first plurality of subsequent layers, and a second plurality of subsequent layers. The first plurality of subsequent layers applies BS gates to the first group of qubits according to a binary tree pattern, where each BS gate is a single parametrized 2-qubit gate. The second plurality of subsequent layers applies controlled BS gates (c-BS gates) to qubits in the first and second groups, where each c-BS gate applies a BS gate to qubits in the second group and is controlled by a qubit in the first group and the number of layers in the circuit is not more than ceiling($\sqrt{n} \log_2(n)$). In some embodiments, this quantum circuit is a portion of a larger quantum circuit that includes additional layers.

Part 2: Applications of Methods for Loading Classical Data into Quantum States

We show how to use the quantum data loader circuits described in Part 1 in order to perform a number of fundamental procedures that are useful among others in machine learning and optimization, including applications in distance estimation, inner product estimation, linear algebra, classification, clustering, neural networks, and many more. These are only some of the possible applications and more can be determined based on the method we describe here. The below descriptions use the parallel loader circuit for convenience. Other quantum data loader circuit embodiments, such as the second loader circuit, can also be used to perform these procedures.

1. Distance Estimation

First Embodiment

In one aspect, we have as input two n-dimensional vectors $(x_1, x_2, \ldots, x_n)$ where $x_i$ is a real number and $(y_1, y_2, \ldots, y_n)$ where $y_i$ is a real number and the Euclidean norms of the vectors are respectively $\|x\|^2 = \Sigma_{i=1}^{n} |x_i|^2$ and $\|y\|^2 = \Sigma_{i=1}^{n} |y_i|^2$.

One can define different types of distances between data points and here, in one aspect, we define the distance between these two data points in the following way:

$$d^2(x, y) = \frac{\|x-y\|^2}{2(\|x\|^2 + \|y\|^2)} = \frac{\Sigma_{i=1}^{n} |x_i - y_i|^2}{2(\|x\|^2 + \|y\|^2)} \quad (13)$$

Figure 2:
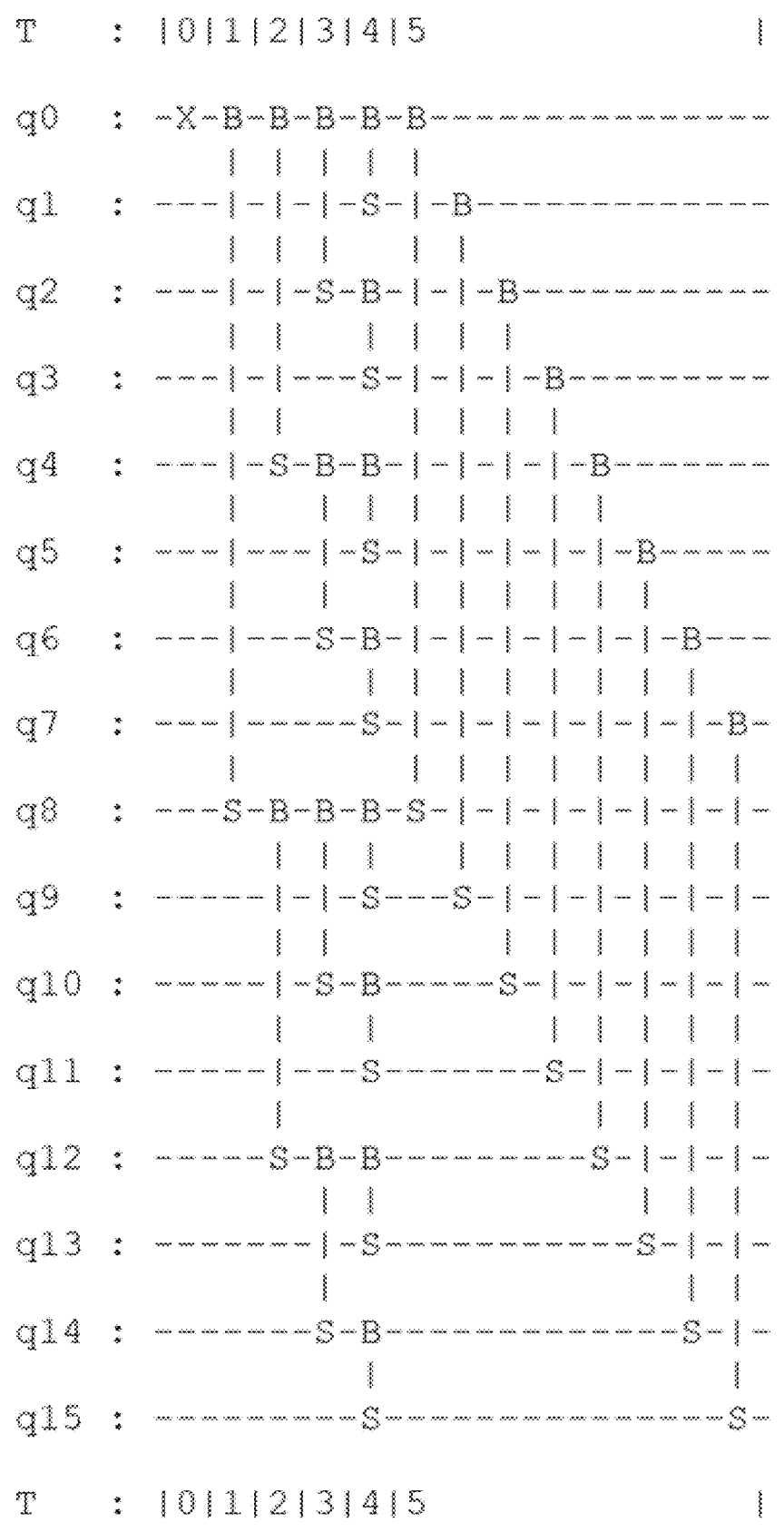

FIG. 2 provides one specific implementation of our method for estimating the distance between two 8-dimensional data point $x=(x_1, x_2, \ldots, x_8)$ and $y=(y_1, y_2, \ldots, y_8)$. In this implementation, the first gate BS on the left (at T=1) has a parameter $$\theta_0 = \arccos\left(\frac{\|x\|}{\sqrt{\|x\|^2 + \|y\|^2}}\right).$$

The parameters of the gates BS in the top half of the circuit (related to q0-q7) in FIG. 2 correspond to the parameters of the quantum data loader circuit for the vector $(x_1, x_2, \ldots, x_n)$. The gates BS in the bottom half of the circuit (related to q8-q15) in FIG. 2 correspond to the parameters of the quantum data loader circuit for the vector $(y_1, y_2, \ldots, y_n)$. The last set of BS gates at the rightmost part of the circuit (at T=5) in FIG. 2 have $\theta=\pi/4$. The last set of BS gates may be performed in parallel during a single time step.

The outcome of the circuit described in FIG. 2 is the following quantum state $$\tfrac{1}{2}(\Sigma_{i=1}^{n}|x_i-y_i\|00000000e_i\rangle + \Sigma_{i=1}^{n}|x_i+y_i\|e_i00000000\rangle) \quad (14)$$

The probability hence of observing all 0s in the first half of the qubits is exactly $d^2(x, y)/4$.

The number of qubits used for the quantum circuit, the depth of the circuit and the number of two-qubit and three-qubit gates are given below for different dimensions and in the general case:

For dimension 8: qubits=16; depth=6; number of two-qubit gates=23; 3-qubit gates=0.

Dimension 1024: qubits=2048; depth=13; two-qubit gates=3071; 3-qubit gates=0.

Dimension n: qubits=2n; depth=log(n)+3; 2-qubit gates=3n−1; 3-qubit gates=0.

Since the depth of a circuit may correspond to the running time or time complexity of the circuit, the distance between two vectors can thus be determined in $\sim O(\log(n))$.

The following is a description of a quantum circuit according to this first embodiment: a quantum circuit is formed for use in encoding a first n-dimensional vector representing classical data into a first quantum state of n qubits, encoding a second n-dimensional vector representing classical data into a second quantum state of n qubits, and determining a distance between the first n-dimensional vector and the second n-dimensional vector. The quantum circuit includes 2n qubits, a first layer comprising an X gate applied to one of the qubits, a first group of subsequent layers, and an additional layer. The first group of subsequent layers applies BS gates to the qubits according to a binary tree pattern, where each BS gate is a single parametrized 2-qubit gate. The additional layer is after the first group and it applies BS gates in parallel to pairs of qubits, where a first qubit in a pair is associated with a first quantum state and a second qubit in a pair is associated with a second quantum state. The number of layers in the circuit is not more than ceiling($\log_2(n)+3$). In some embodiments, this quantum circuit is a portion of a larger quantum circuit that includes more layers.

Second Embodiment

In one aspect, we have as input two n-dimensional vectors $(x_1, x_2, \ldots, x_n)$ where each $x_i$ is a real number and $(y_1, y_2, \ldots, y_n)$ where each $y_i$ is a real number and the Euclidean norms of the vectors are respectively $\|x\|^2 = \Sigma_{i=1}^{n}|x_i|^2$ and $\|y\|^2 = \Sigma_{i=1}^{n}|y_i|^2$.

One can define the inner product between the two vectors as $(x, y)=\|x\|\|y\|\langle x,y\rangle = \Sigma_{i=1}^{n} x_i y_i$, where $\langle x, y \rangle$ is the inner product between the normalized vectors.

Figure 3:
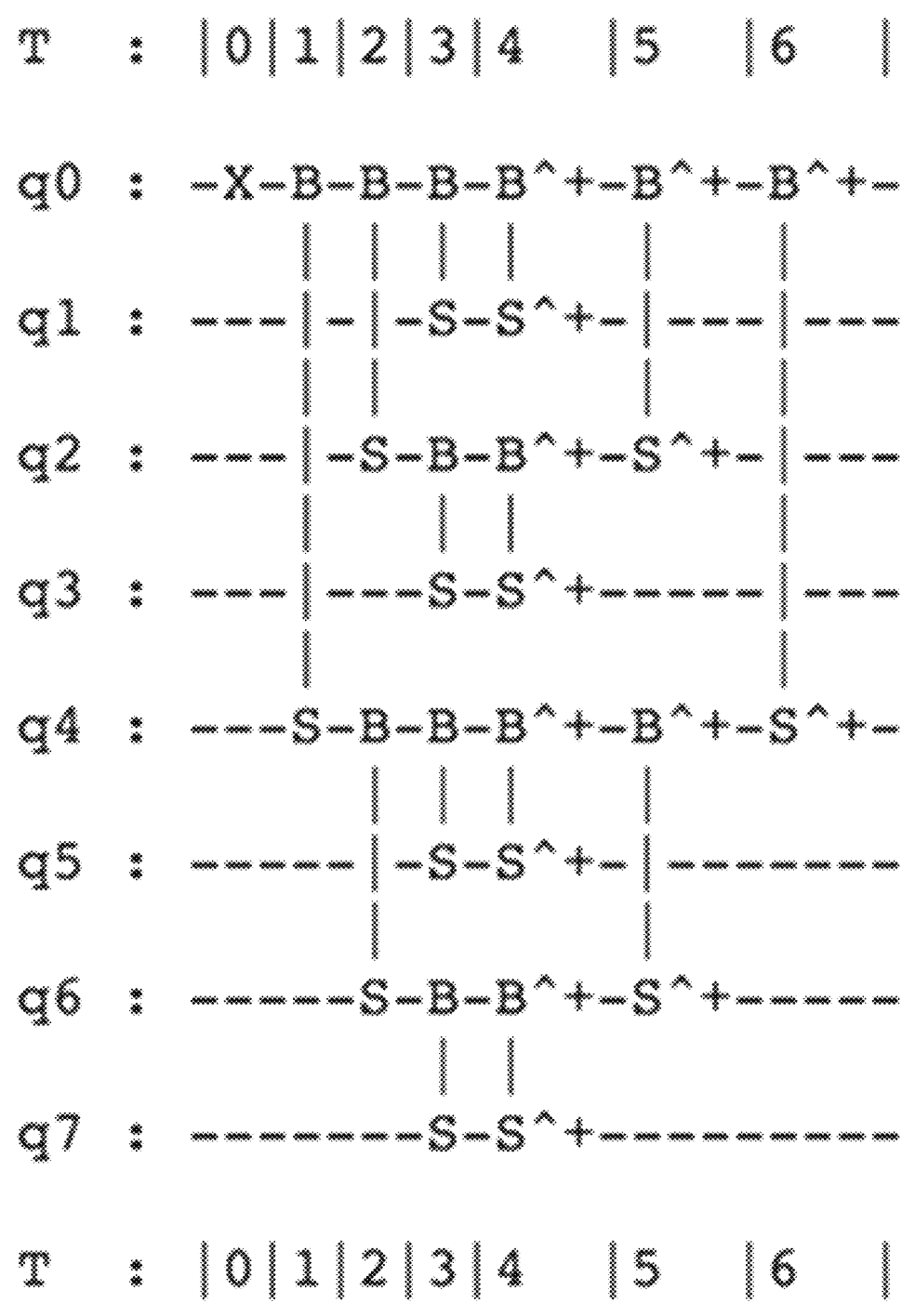

FIG. 3 provides one specific implementation of our method for estimating the distance between two 8-dimensional data points $x=(x_1, x_2, \ldots, x_8)$ and $y=(y_1, y_2, \ldots, y_8)$. In this implementation we have: the first half of the circuit corresponds to the parallel loader circuit for the normalized vector x, as in FIG. 1A, and the second half of the circuit corresponds to the complex conjugate of the loader circuit for vector y. In other words, the circuit is created by reversing the order of the gates for the loader circuit of y and conjugating each gate.

The conjugate of the gate $BS(\theta)$ is denoted as $BS^+(\theta)$ and is equal to $$BS^+(\theta)=[[1,0,0,0],[0, \cos(\theta),-\sin(\theta),0],[0, \sin(\theta), \cos(\theta),0],[0,0,0,1]] \quad (15)$$

The outcome of the circuit described in FIG. 3 is the following quantum state $$\langle x,y\rangle|e_1\rangle+\sqrt{1-\langle x,y\rangle^2}|e_1^\perp\rangle \quad (16)$$

where $|e_1^\perp\rangle$ is any state orthogonal to $|e_1\rangle$.

Thus, the probability of measuring the state $|e_1\rangle$ gives us the square of the inner product between the two normalized vectors and using the information about their norms we can output an estimator for the inner product (x, y).

One could also change the above construction to one that estimates directly the distance by considering the vectors $x=(\|x\|, x_1, x_2, \ldots, x_n)$ and $y=(\|y\|, y_1, y_2, \ldots, y_n)$ and now the probabilities of the measurement outcomes become proportional to $d^2(x, y)$.

The number of qubits used for the quantum circuit, the depth of the circuit and the number of two-qubit and three-qubit gates are given below for different dimensions and in the general case:

For dimension 8: qubits=8; depth=7; number of two-qubit gates=14; 3-qubit gates=0.

Dimension 1024: qubits=1024; depth=21; two-qubit gates=2046; 3-qubit gates=0.

Dimension n: qubits=n; depth=2 log(n)+1; 2-qubit gates=2n−2; 3-qubit gates=0.

Thus, the time complexity of this circuit may be ~O(2 log(n)). While the time complexity is doubled compared to the first embodiment, the number of qubits is reduced by half.

The following is a description of a quantum circuit according to this second embodiment: a quantum circuit is formed for use in encoding a first n-dimensional vector representing classical data into a first quantum state of n qubits, encoding a second n-dimensional vector representing classical data into a second quantum state of n qubits, and determining a distance between the first n-dimensional vector and the second n-dimensional vector. The quantum circuit includes n qubits, a first layer comprising an X gate applied to one of the qubits, a first group of subsequent layers, and a second group of subsequent layers. The first group of subsequent layers applies BS gates to the qubits according to a binary tree pattern, where each BS gate is a single parametrized 2-qubit gate. The second group of subsequent layers applies conjugate BS gates to the same qubits according to the inverse of a binary tree pattern, where each BS gate is a single parametrized 2-qubit gate. The number of layers is not more than ceiling(2 $\log_2$ (n)+1). In some embodiments, this quantum circuit is a portion of a larger quantum circuit that includes additional layers.

2. Inner Product Estimation

The distance of two data points and their inner product are related by the mathematical formula:

$$\text{Inner product}=(\|x\|^2+\|y\|^2)*(\tfrac{1}{2}-d^2(x/y)) \quad (17)$$

And hence the inner product (in addition to the distance) can be estimated. For example, the inner product can be determined for two 8-dimensional data points using the circuit in FIG. 2 or in FIG. 3.

3. Matrix-Matrix Multiplication

One can use the previous inner product estimation quantum method to provide an application in linear algebra, namely Matrix-Matrix multiplication, where given two matrices A and B, one needs to compute C=AB. In one aspect, the method can be embodied in a hybrid classical-quantum way, where for each row of the matrix $A_i$ and each column of the matrix $B_j$ one can invoke the quantum method for inner product estimation to compute each element of the matrix C as $C_{ij}=A_iB_j$.

By performing matrix multiplication via the distance estimation method described above, the operation may be performed with a time complexity of ~$O(n^2 \log(n))$. This is a significant improvement compared to conventional matrix multiplication algorithms, which have time complexities of ~$O(n^3)$.

4. Classification

The distance estimation method we presented above can be readily used to provide applications for classification. We describe here one of the many possible embodiments of this application.

In one aspect, one can use the known Nearest Centroids algorithm where the classification of a data point is performed by computing the distances of the data point to all centroids and choosing the centroid with minimum distance. One can use the distance estimation method described above to provide a hybrid classical-quantum classification algorithm, where the quantum method described with respect to FIG. 2 or 3 is used to classify data points.

5. Clustering

The distance estimation method we presented above can be readily used to provide applications for clustering. We describe herein one of the many possible applications.

In one aspect, one can use a hybrid classical-quantum algorithm based on the well-known k-means algorithm. There, the quantum distance estimation method described above with respect to FIG. 2 or 3 can be used both for assigning data points to centroids (as in the case of classification) and for updating the centroids, where matrix-matrix multiplication is used.

6. Neural Network Training and Evaluation

The inner product estimation method we presented above can be used to provide applications in neural networks. We describe here one of the many possible embodiments of this application.

In one aspect, one can use a hybrid classical-quantum algorithm based on the well-known feed-forward and back-propagation algorithm. There, the quantum inner product estimation method described above with respect to FIGS. 2 and 3 can be used both for multiplying the matrices of data points and weights during the evaluation, and during the backpropagation algorithm (which may be gradient descent algorithm) where again matrix-matrix multiplication is used.

Alternative embodiments of our methods disclosed herein will be readily recognized as viable alternatives that may be employed without departing from the principles of what is disclosed.

Part 3: Hardware Implementations of a Quantum Data Loader

As described above a quantum data loader (QDL) is a device that takes as input a classical vector of n real numbers, $(x_1, x_2, \ldots, x_n)$, and outputs the following quantum state that encodes this classical data:

$$\Sigma_{i=1}^{n} x_i |e_i\rangle, \tag{18}$$

where $e_i$ is the unary representation of i. A quantum data loader is a quantum processing device (e.g., a specialized non-universal quantum processing device). A quantum data loader may be used for other tasks beside data loading (e.g., processing data that was previously loaded, for example, by the data loader).

There are many possible hardware platforms that quantum data loaders can be realized with. This disclosure presents designs for quantum data loaders in a number of different platforms, including superconducting circuits, semiconductor quantum dots, trapped ions, trapped atoms, and photonics (e.g., photonic chips). These are only some of the possible hardware implementations and more may be constructed based on the same method we describe here or for different qubit technologies.

This disclosure also presents designs where the quantum data loader is built in a different hardware platform than a quantum computer (e.g., a universal quantum computer) that processes the loaded data. This may be advantageous because there may be hardware platforms that are better suited for quantum data loading operations and other hardware platforms that are better suited for (e.g., universal) quantum processing operations.

Some embodiments of the quantum data loader construction include the ability to perform unitary operations (e.g., beam splitter-type unitary operations) between pairs of qubits that may be non-adjacent (e.g., if the qubits are laid out on a two-dimensional plane). As described above, an example unitary operation is:

$$BS(\theta) = \begin{pmatrix} 1 & 0 & 0 & 0 \\ 0 & \cos\theta & \sin\theta & 0 \\ 0 & -\sin\theta & \cos\theta & 0 \\ 0 & 0 & 0 & 1 \end{pmatrix}. \tag{19}$$

1. Implementation with Qubits

A gate within the family that we call $BS(\theta)$ may be used to couple two (e.g., superconducting) qubits in a way that the following gate can be applied directly for any parameter $\theta$:

$$fSIM(\theta,\varphi)=[[1,0,0,0],[0, \cos(\theta),-i^*\sin(\theta),0],[0,-i^*\sin(\theta), \cos(\theta),0],[0,0,0,e^{-i\varphi}]] \tag{18}$$

Thus, the quantum data loader, as described above, can be implemented using these gates, albeit a new connectivity may be used with respect to the current connectivity of the qubit machines, which may be connected as a 2-D grid.

FIG. 4 shows an example with a quantum data loader using n=32 qubits. The qubits (labeled 1-32) are in a 2D plane and arranged in a grid pattern (although this is not required for a quantum data loader). In the figure, the circles (O) represent qubits and the horizontal (—) lines, the vertical (|) lines, and the dotted line represent connections between pairs of qubits. There are n−1=31 connections in total. Connections represent hardware with the ability to perform a 2-qubit gate interaction (e.g., BS(0)) between a pair of qubits. In this figure, the horizontal and vertical lines represent connections between adjacent qubits (referred to as adjacent connections). In the grid pattern of FIG. 4, an adjacent qubit (also referred to as a nearest neighbor qubit) is a qubit that is directly above, below, to the left, or to the right of another qubit. The quantum data loader also includes a non-adjacent connection (also referred to as a long-range connection) between qubits 1 and 17 (represented by the dashed line). Non-adjacent qubits may also exist for non-grid layouts and for qubits positioned in 1D and 3D arrangements in addition to 2D arrangements. Generally, a pair of non-adjacent qubits are qubits that are far enough apart, or with sufficiently many obstructing qubits or wires between them, that the mechanism used to couple qubits in the physical platform they are implemented with does not work to implement a two-qubit interaction directly between the pair without some modification (examples describe below) to the coupling procedure or hardware. In some embodiments, a pair of qubits are non-adjacent if at least one qubit is located between them. Two-qubit interactions between a pair of qubits may be realized in superconducting circuits by a capacitive coupling between the qubits, which can involve a capacitance between the two qubits that falls off with the physical distance between them. Thus, in this scenario, it may only be possible to have qubits interact strongly if they are physically near each other (adjacent). Even if the physical-distance requirement is lifted, e.g., by mediating the interaction via a wire or resonator, adjacency may still be important for physical realizations in which wires or resonators are not allowed to cross or overlap.

The connections and qubit labels in FIG. 4 are as follows. A first group of 8 qubits includes two rows of four qubits that are aligned with each other. Qubits 7, 5, 1, and 3 are on a top row and qubits 8, 6, 2, 4 are on a bottom row. A qubit 1 is vertically connected to qubit 2, which is below qubit 1. Qubit 1 is horizontally connected to qubits 3 and 5. Qubit 3 is vertically connected to qubit 2. Qubit 5 is vertically connected to qubit 6 and horizontally connected to qubit 7 (in addition to qubit 1). Qubit 7 is vertically connected to qubit 8. A second group of 8 qubits also includes two rows of four qubits aligned with each other. The second group is aligned with the first group. The relative qubit labeling and connections of the second group mirror the relative labeling and connections of the first group. More specifically, qubits 16, 14, 10, and 12 are on a top row and qubits 15, 13, 9, and 11 are on a bottom row. Qubits (16 and 15), (14 and 13), (10 and 9), and (12 and 11) are vertically connected, and qubits 15, 13, 9, and 11 are horizontally connected (in that order). Qubits 9 and 1 are vertically connected to connect the two groups together. FIG. 4 includes a third and a fourth group. These groups mirror the first and second groups. Qubit 17 from the third group is vertically connected to qubit 25 of the fourth group to connect the two groups together. As already stated, a non-adjacent connection connects qubits 1 and 17 together. As further described below, the connection and labeling pattern in FIG. 4 can be extended to larger groups of qubits (e.g., see FIGS. 8-11).

The specific connections and qubit labels allow the quantum data loader in FIG. 4 to execute quantum circuits that load classical data into a quantum state. For example, qubits 1-8 are labeled and connected in such a way that they may be used to execute the circuit illustrated in FIG. 1A. More specifically, at time step 1 a BS gate operation is performed on qubits 1 and 5 (labeled q0 and q4 in FIG. 1A) via the connection between qubits 1 and 5 ("1-5"). At time step 2, a BS gate operation is performed on qubits 1 and 3 (labeled q0 and q2 in FIG. 1A) via connection 1-3 and a BS gate operation is performed on qubits 5 and 7 (labeled q4 and q6 in FIG. 1A) via connection 5-7. Similarly, at time step 3, BS gate operations are performed on the corresponding qubits via connections 1-2, 3-4, 5-6, and 7-8 perform.

Although other connections and labeling schemes are possible, the scheme in FIG. 4 reduces (e.g., minimizes) the number of non-adjacent connections for a 32-qubit data loader circuit (assuming the qubits are arranged in a 2D grid). Non-adjacent connections may be more prone to noise or errors. Thus, it may be advantageous to connect and label qubits (for any given arrangement) so that the number of non-adjacent connections used to execute a data loader circuit is minimize or reduced.

FIGS. 5A-5F illustrate the quantum data loader in FIG. 4 executing a 32-qubit data loader circuit (similar to the circuit in FIG. 1A) at various time steps. In the figures, a dotted line represents a 2-qubit gate operation (e.g., a BS gate operation). For example, at time step 0 (FIG. 5A), an X gate is applied to qubit 1. At time step 1 (FIG. 5B), an BS gate is applied to qubits 1 and 17. At time step 2 (FIG. 5C), BS gates are applied to qubits (1 and 9) and (17 and 25). At time step 3 (FIG. 5D) BS gates are applied to qubits (1 and 5), (9 and 13), (17 and 21), and (25 and 29). Similarly, at time steps 4 (FIG. 5E) and 5 (FIG. 5F) BS gates are applied to qubits as indicated.

Figure 6A:
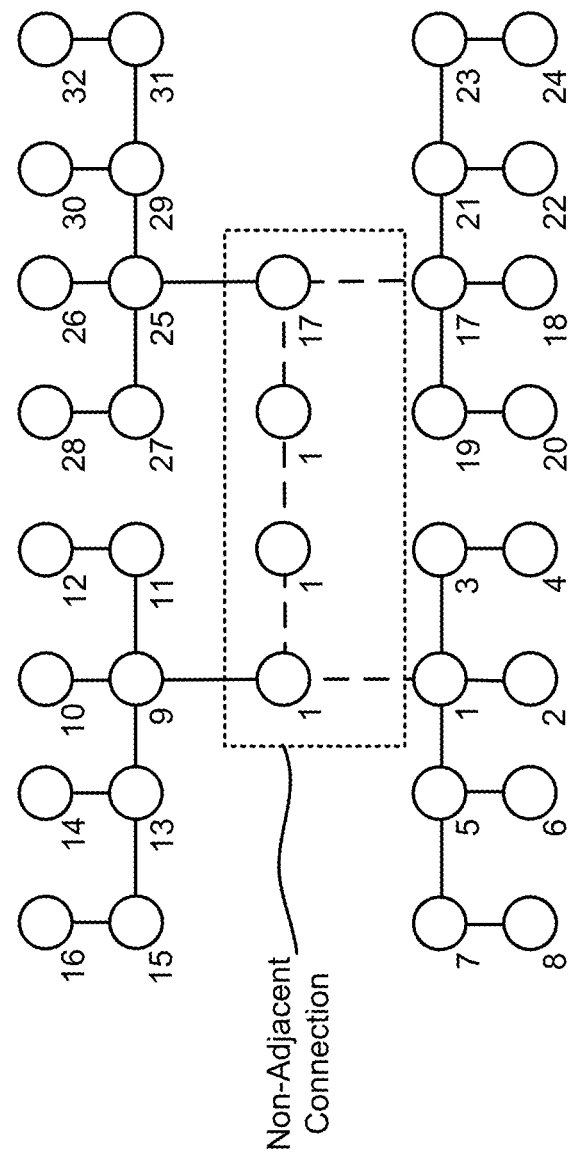
FIGS. 6A-6C illustrate a quantum data loader with qubits on a 2D lattice having only nearest-neighbor connectivity by introducing auxiliary qubits that are copies of certain qubits (Qubits 1 and 17), according to some embodiments.

FIGS. 6A-11 illustrate hardware that may be used to implement non-adjacent connections for qubits arranged in a 2D grid. However, this hardware may be used to implement non-adjacent connections for qubits in other arrangements (e.g., qubits not arranged in a 2D grid). FIG. 6A shows one possible design for the arrangement of qubits in a quantum data loader for vectors of dimension 32 that uses 36 qubits. In FIG. 6A the long-range connection includes extra physical qubits (referred to as ancilla qubits) that are copies of Qubit 1 and Qubit 17, such that the interactions can be performed between qubits that are nearest neighbors. By "copy," what is meant is that the information from Qubits 1 and 17 may be propagated across the ancillae (e.g., using SWAP operations) prior to a logical Qubit 1-Qubit 17 operation being performed, and then the information may be propagated back (e.g., using the reverse sequence of SWAP operations). A disadvantage of the design shown in FIG. 6A (and extensions thereof for quantum data loaders with larger numbers of qubits) is that it includes additional qubits that are (e.g., purely) for the purpose of communication.

Figure 6B:
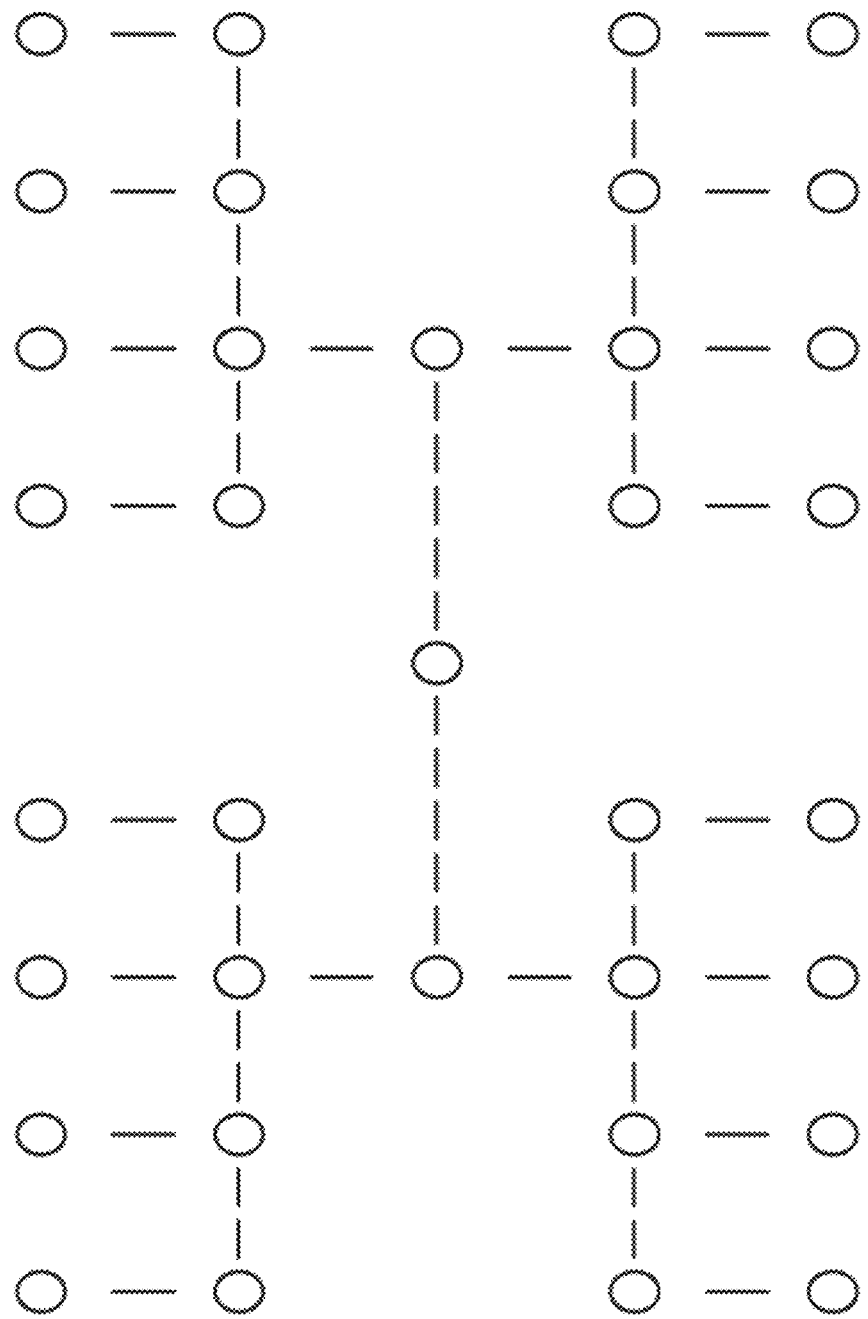
Figure 6C:
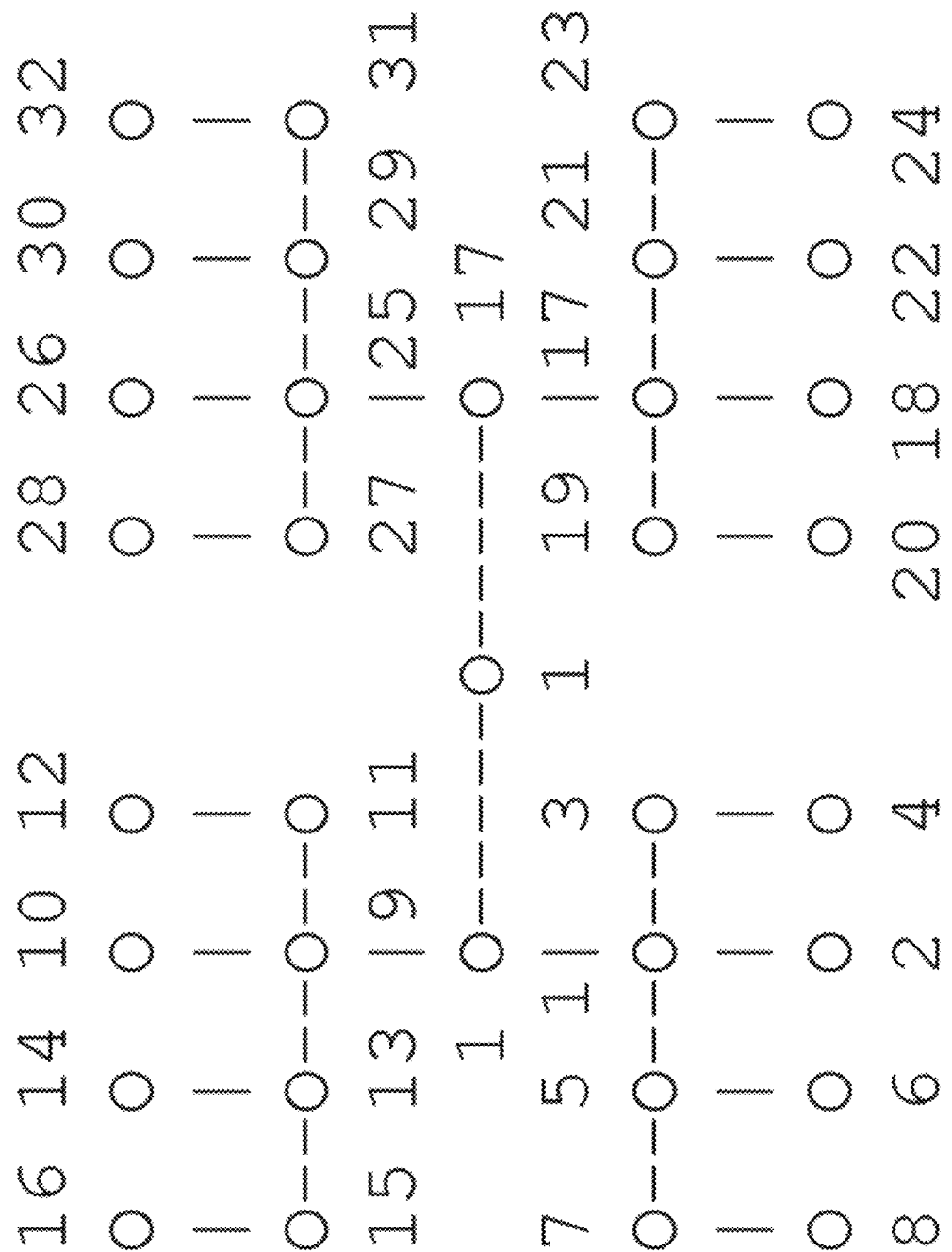

FIG. 6B illustrates a hardware architecture for a quantum data loader for vectors of dimension 32 that uses 35 qubits (32 corresponding to the qubits used for the loader and 3 ancilla qubits that repeat some qubits to fit the loader within a grid of dimensions 9×5. FIG. 6C illustrates how the 32 dimensions may be mapped onto the qubits of the grid. Many alternative embodiments are possible, all following our method of an embedded tree-structure connectivity.

FIGS. 7-10 show various examples of possible ways to implement non-adjacent connections using a bus to connect qubits that are not spatially close to one another. A bus may couple two (or more) qubits together. A bus is device that can mediate interactions between two (or more) distant qubits that are each connected to the bus, for example by mediating the exchange of photons between the qubits. A bus may be used in various hardware platforms, such as in superconducting-circuits, trapped ions, and semiconductor quantum dot spins. For example, two superconducting qubits coupled to a bus (e.g., a resonator) may undergo the following unitary evolution when the frequencies of those qubits are set to be equal (a qubit's frequency is the energy difference between the qubit's 0 state and the qubit's 1 state, in units of frequency):

$$U \propto \begin{pmatrix} 1 & 0 & 0 & 0 \\ 0 & \cos((g^2/\Delta)t) & i\sin((g^2/\Delta)t) & 0 \\ 0 & i\sin((g^2/\Delta)t) & \cos((g^2/\Delta)t) & 0 \\ 0 & 0 & 0 & 1 \end{pmatrix}. \tag{20}$$

Here g is the coupling strength (rate) between each qubit and the bus, and $\Delta$ is a detuning (separation in frequency) between each qubit and the bus. Up to a phase factor that can be corrected using 1-qubit gates, this interaction can provide the beam splitter unitary BS($\theta$). The action of the bus may be approximated as performing BS($\theta$) when two qubits have the same frequency, and may not mediate any interaction when qubits coupled to the bus each have different frequencies. Many qubits (e.g., many more than 2) can be coupled to the bus and not interact, provided that each of their frequencies are different.

Figure 7:
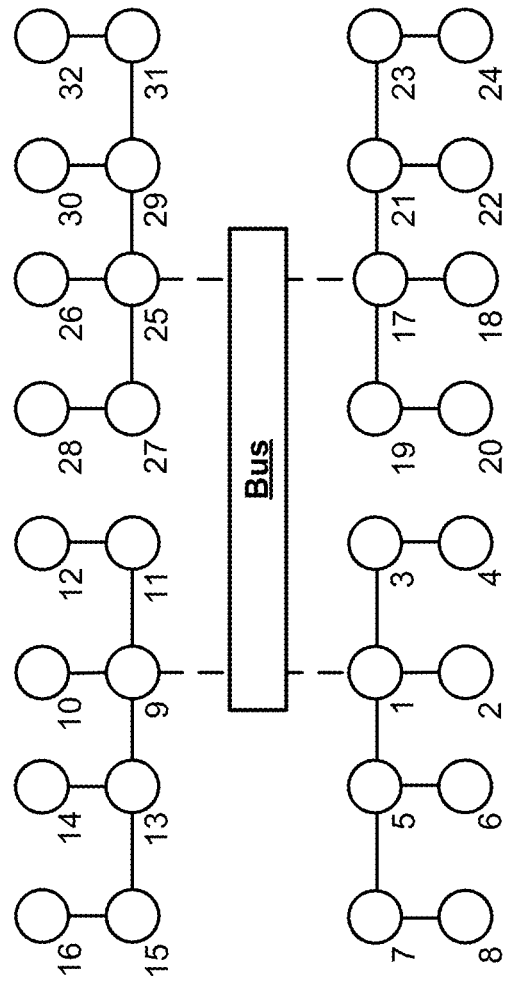
FIG. 7 illustrates a 32-qubit quantum data loader in which a bus mediates long-range interactions (between Qubits 1 and 17, 1 and 9, and 17 and 25), according to an embodiment.
Figure 8:
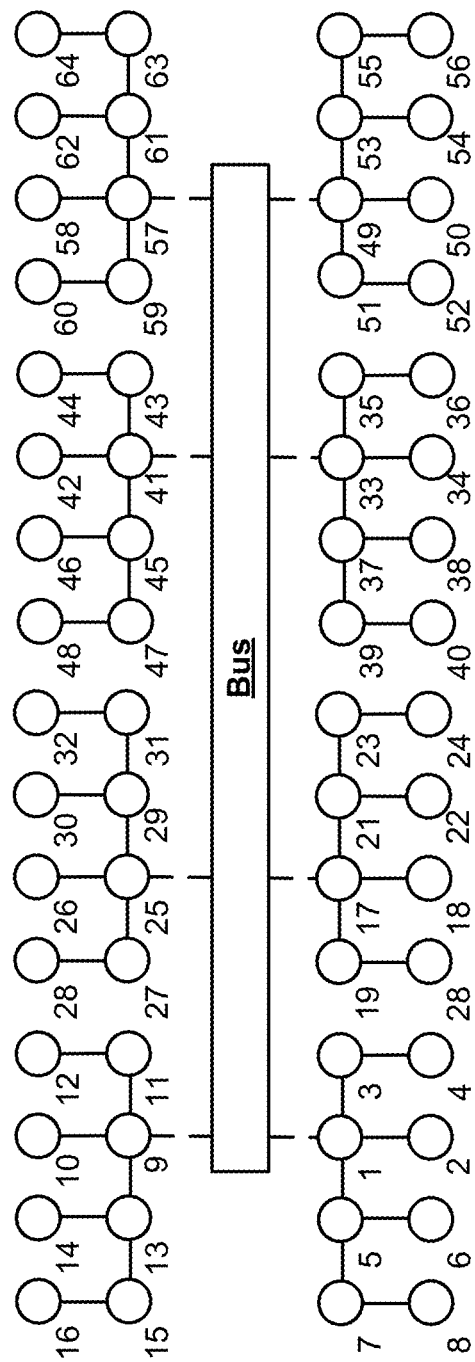
FIG. 8 illustrates a 64-qubit quantum data loader in which a bus mediates long-range interactions (between Qubits 1 and 33, 1 and 17, 1 and 9, 17 and 25, 33 and 49, 33 and 41, 49 and 57), according to an embodiment.

FIG. 7 shows an example design of a quantum data loader with n=32 qubits in which four qubits (Qubits 1, 9, 17 and 25) are coupled to a bus. In this embodiment, the location of the bus in the middle may result in the connections between qubits (1 and 9) and (17 and 25) being non-adjacent connections. The other qubits interact via nearest-neighbor connections and thus may not need a bus to provide connections between them. For the four qubits coupled to the bus, each qubit may be assigned a distinct frequency, and whenever a pair of long-range qubits interact (e.g., (1 and 9), (1 and 17), (17 and 25)) then one of the qubits in the pair may have its frequency temporarily modified to be the same (e.g., within an error threshold) as that of the frequency of the other qubit in the pair. FIG. 8 shows an example of a similar design as FIG. 3, but for n=64 qubits.

FIGS. 7 and 8 illustrate bus-based designs where it is assumed that the bus is created on the same layer in the quantum data loader chip as the qubits. However, in some embodiments, some physical platforms use multiple layers, in which case a bus may be fabricated in a different layer than some or all of the qubits it couples together. This may be advantageous because it means that qubits can all be placed closer together in the 2D grid, with the bus for mediating long-range interactions above or below the qubits. These embodiments may allow the qubits to efficiently execute general quantum circuits (e.g., that use 2D grid connectivity) in addition to quantum data-loader circuits. An example of this bus arrangement is shown in FIG. 9. Note that in FIG. 9, the connections between the bus and and qubits 1, 9, 17, 25, 33, 41, 49, and 57 are not illustrated. That being said, the qubits may be closer together because the bus is on another layer. This allows certain connections to be adjacent connections (e.g., qubits 1 and 9 are connected by an adjacent connection).

It is possible in bus-based quantum data loader designs that so many qubits are coupled to a single bus (e.g., 9-1000 qubits depending on the hardware) that it may not be possible to assign each qubit a different frequency that is sufficiently distinct from the frequencies of all the other qubits coupled to the bus (e.g., a separation in frequency by at least 10 MHz, although the value will depend on the details of the underlying physical hardware and the value may be different from this by orders of magnitude). This may be referred to as the frequency-crowding problem. A solution to this problem is to introduce multiple buses so that each bus does not have more qubits coupled to it than there are distinct frequencies. FIG. 10 shows an example of such a multi-bus design applied to make an n=64-qubit quantum data loader. Specifically, the quantum data loader includes bus A coupled to qubits 1, 9, 17, 25, 33, and 41 and bus B coupled to qubits 33, 49, and 58. Bus A is used to mediate interactions between qubits 1 and 9, 1 and 17, 1 and 33, 17 and 25, and 33 and 41. Bus B is used to mediate interactions between qubits 33 and 49, and 49 and 57. It is possible in general, and even in this specific case of n=64, to use more than two buses. A general constraint with multiple buses is the number of buses a single qubit can be connected to. This number may be determined by the specific physical implementation and the desired physical properties (e.g., coupling strengths).

Figure 11:
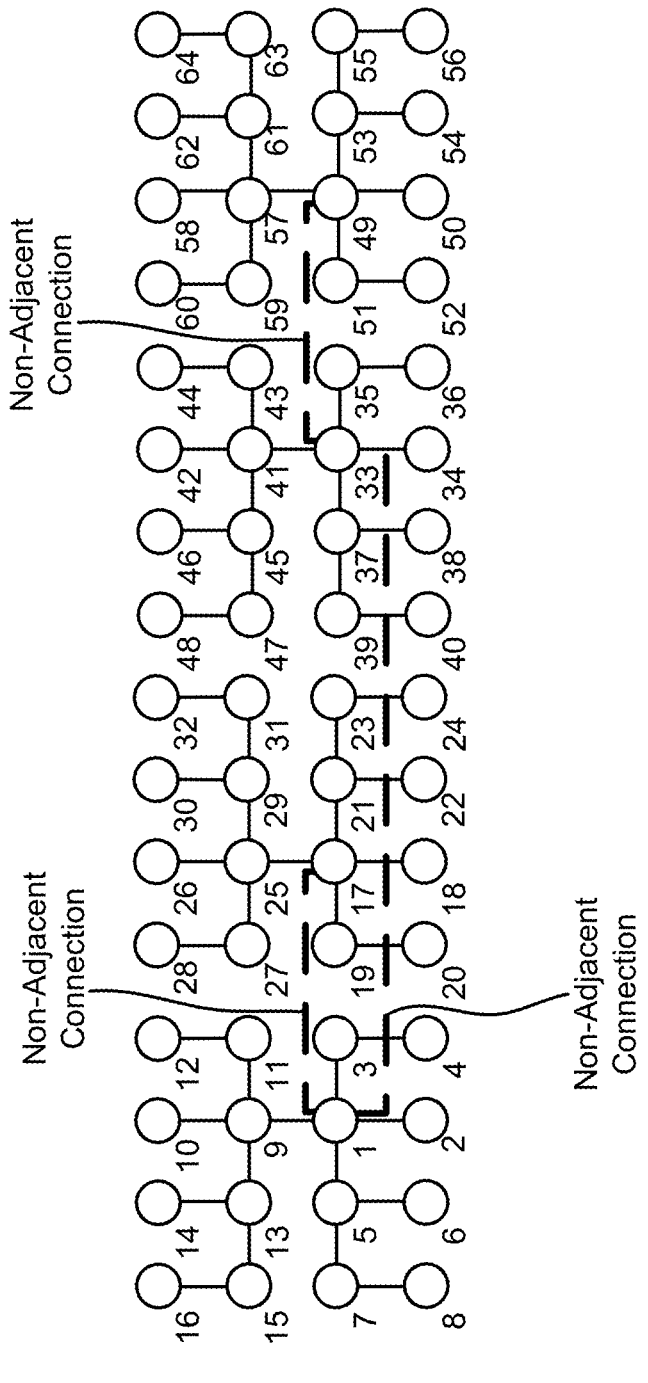
FIG. 11 illustrates a 64-qubit quantum data loader in which long-range pairwise couplers are placed to mediate long-range interactions (between Qubits 1 and 33, 1 and 17, 33 and 49), according to an embodiment.

In some embodiments, physical platforms allow for long-range interactions to be mediated by additional physical connections. In the case of semiconductor quantum dot spin qubits, long-range interactions may be mediated by a metal wire (e.g., with a wishbone structure). In the case of trapped-ion qubits, an ion-shuttling path module may allow qubits to be physically moved along shuttling paths between various locations (e.g., by a space-and-time-varying electric field applied by electrodes along the path), so a qubit can be physically brought into proximity (e.g., adjacent) with another qubit that was far away (e.g., not adjacent) in order for those qubits to interact. In some embodiments, both qubits move towards each other along a shuttling path so they become adjacent at a point along the path. Afterwards, the qubit can be moved back to its original location. A shuttling module and path can schematically be represented by a line in a diagram of qubits. FIG. 11 shows a quantum data loader design with n=64 qubits where the long-range interactions are mediated by connectivity made available by hardware architectures, such as wires in the case of quantum dot spins and shuttling paths in the case of trapped ions. Depending on the implementation and the type of qubits, the long-range connections may be inside or outside of the 2D plane.

2. Implementation with Linear Optics

A gate within the family that we call BS(θ) may also be implemented on linear optics schemes by implementing reconfigurable beam splitters, also referred to as tunable beam splitters. An example reconfigurable beam splitter is a Tunable Mach-Zender Interferometer.

Figure 12A:
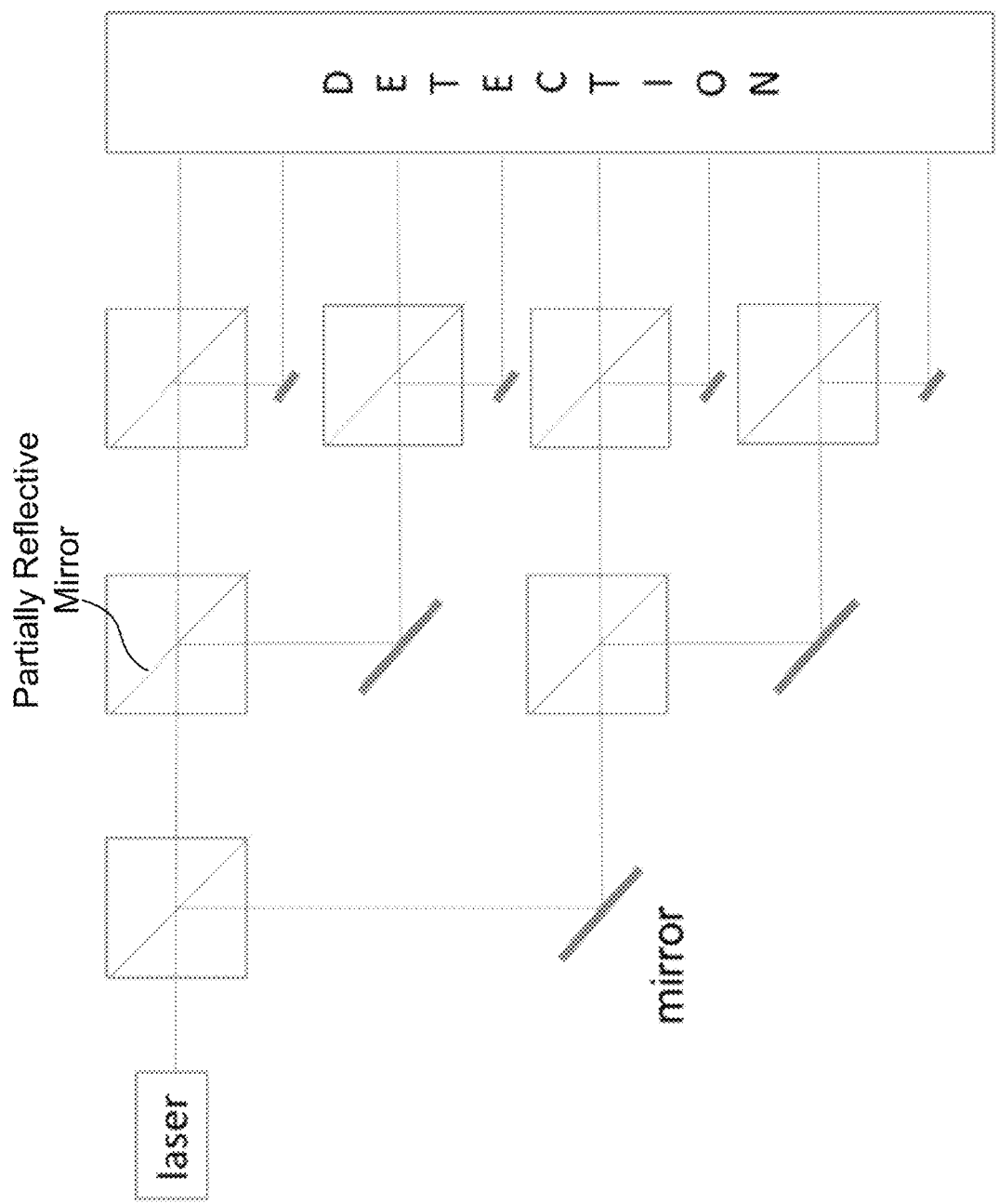
FIGS. 12A-12C are diagrams showing possible hardware implementations of the quantum data loader using linear optics, according to some embodiments. For example.
Figure 12B:
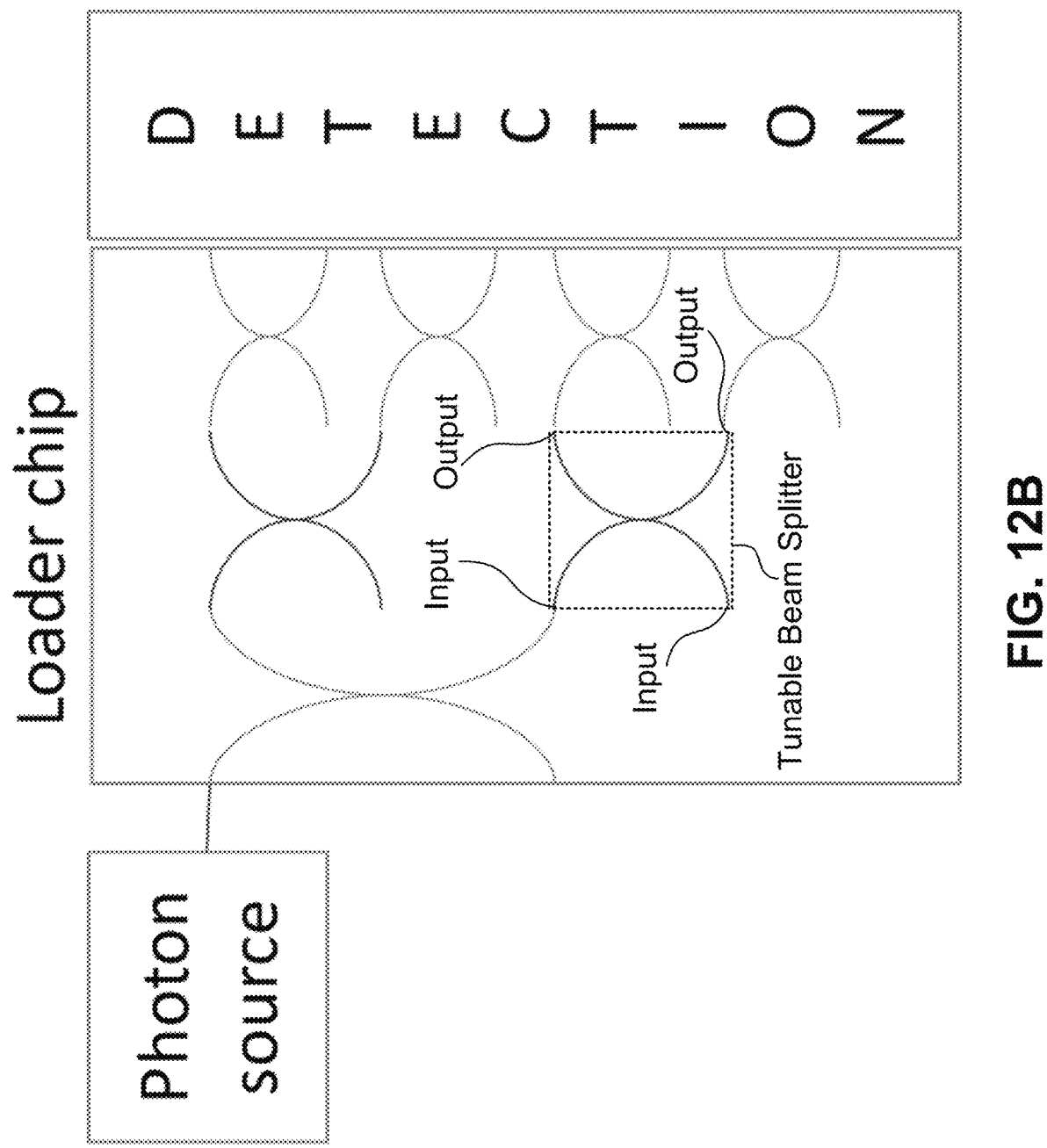

In FIG. 12A, reconfigurable beam splitters are implemented as partially reflective mirrors, according to an embodiment. The partially reflective mirrors may perform quantum gate operations (e.g., BS gate operations). In FIG. 12B, we denote a reconfigurable beam splitter as a gate with two inputs and two outputs that performs a quantum gate operation (e.g., of the family BS(θ)). Each reconfigurable beam splitter may have a parameter θ (not illustrated) that corresponds to the ratio of reflectance versus transmittance (e.g., it splits coupled light with cos(θ) being reflected and sin(θ) being transmitted). The parameter may be referred to as the coupling ratio. Thus, a quantum data loader may be implemented using a single-photon source and reconfigurable beam splitters. In some embodiments, photon detectors are coupled to the output ends of the loader. However, in other embodiments, the beam splitters may be coupled to another quantum processing device (e.g., as further described with respect to FIGS. 15 and 16). In some embodiments, the quantum data loader is implemented in integrated photonic chips.

Figure 12C:
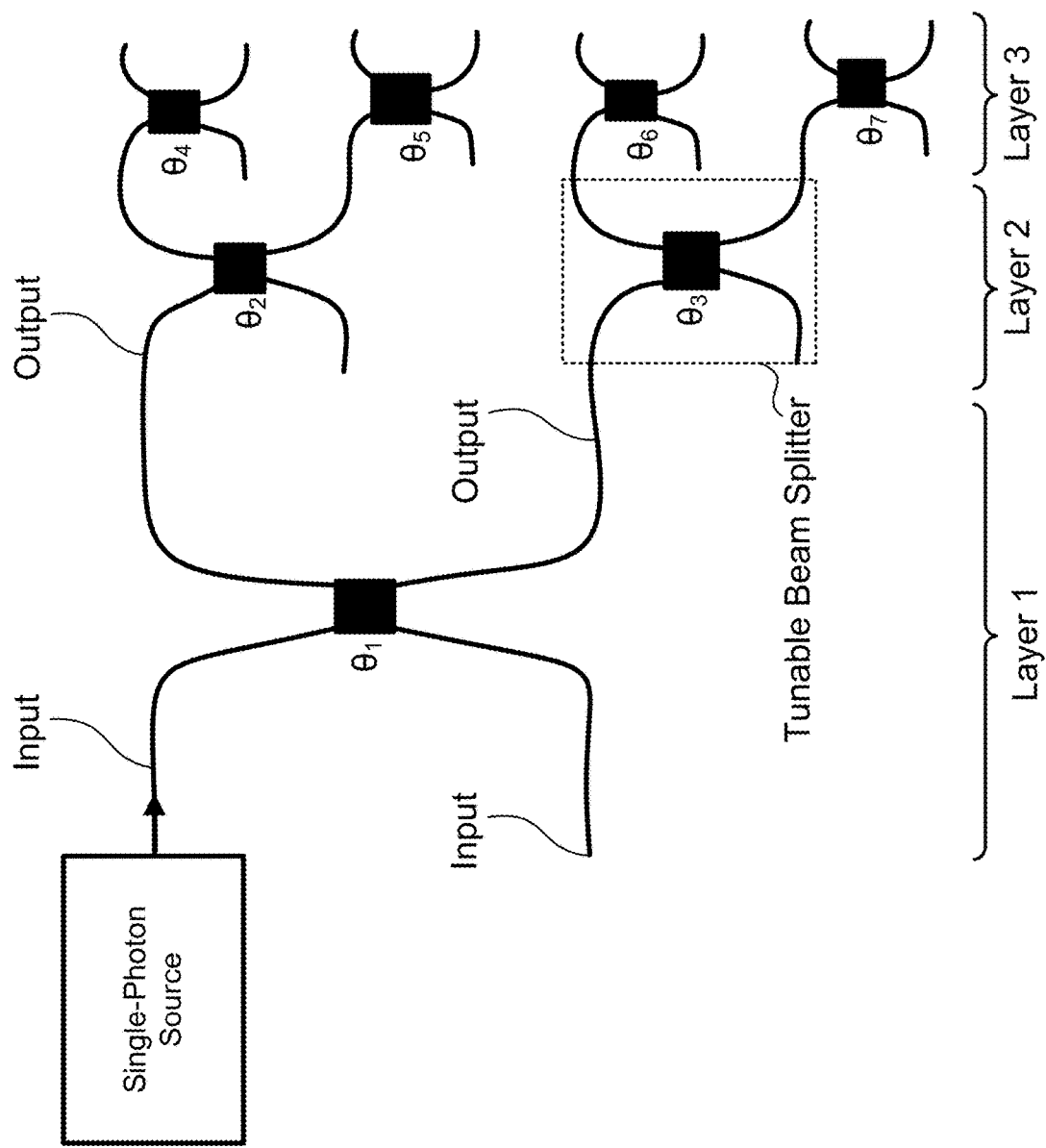

FIG. 12C shows another photonic-circuit implementation of a quantum data loader. A single-photon source launches a single photon into a network of on-chip beam splitters having tunable coupling ratios ($\theta_i$).

Referring to FIGS. 12A-12C, the beam splitters are coupled together according to a binary tree pattern. More specifically, they are coupled according to a perfect binary tree pattern (a binary tree in which all interior nodes have two children, and all leaves have the same depth). However, other tree patterns are possible. The coupling pattern depends on the size of the n-dimensional classical data vector and the type of data loader circuit to be executed/implemented. The number of beam splitters used to load an n-dimensional classical data vector may be n−1. Thus, FIGS. 12A-12C may be used to load an 8-dimensional vector.

To perform a quantum gate operation, the coupling ratio of a beam splitter may be based on a parameter of the quantum gate. For example, the coupling ratio of a beam splitter is based on θ of the BS(θ) gate. More specifically, the coupling ratios (e.g., in FIG. 12C) may correspond to the angles θ described above with respect to equations (2)-(6).

To demonstrate, the data loader in FIG. 12C may be used to load data according to the circuit in FIG. 1A. Referring to FIG. 1A, the BS gate at time step 1 may be implemented by the root node beam splitter (layer 1) of FIG. 12C, the BS gates at time step 2 may be implemented by the beam splitters in layer 2 of FIG. 12C, and the BS gates at time step 3 may be implemented by the beam splitters in layer 3 of FIG. 12C. Note that the X gate in FIG. 1A is implemented in FIG. 12C by the generation of a photon by the single-photon source since a photon corresponds to the $|1\rangle$ state and no photon corresponds to the $|0\rangle$ state.

Figure 13:
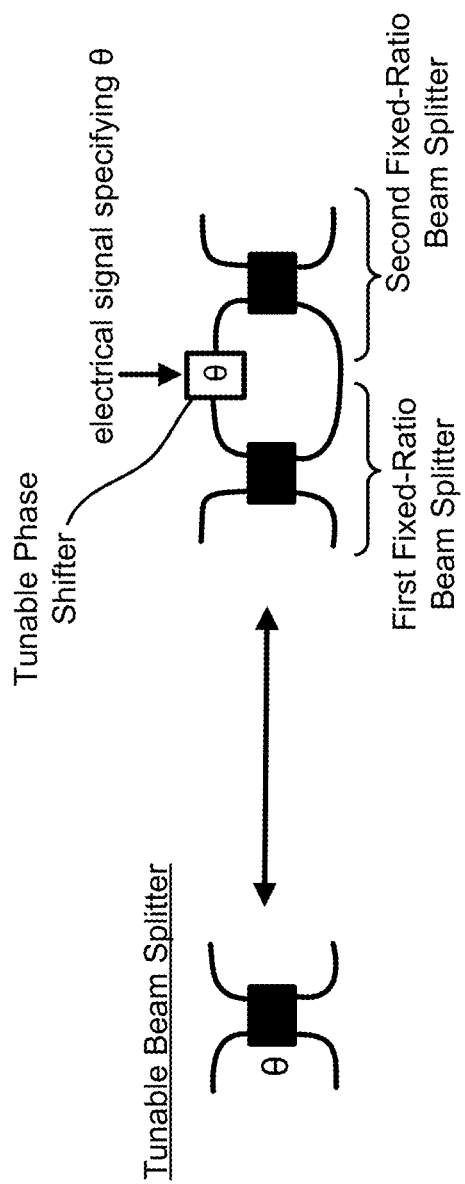
FIG. 13 illustrates a hardware implementation of a tunable beam splitter, according to an embodiment.

FIG. 13 shows one way to realize such beam splitters: using a Mach-Zehnder-Interferometer comprising two fixed-ratio (e.g., 50/50) on-chip beam splitters and (e.g., electrically controllable) tunable phase shifter. The phase shifter can be implemented in a variety of ways, including using a thermo-optic or micro-electro-mechanical-system (MEMS) phase shifter if the chip is made in a silicon-photonics process, or with an electro-optic phase shifter if the chip is made with lithium niobate. There may be a tradeoff between speed and manufacturability: thermo-optic phase shifters have speed ~100 kHz, MEMS phase shifters ~MHz, and electro-optic phase shifters ~100 GHz.

Figure 14:
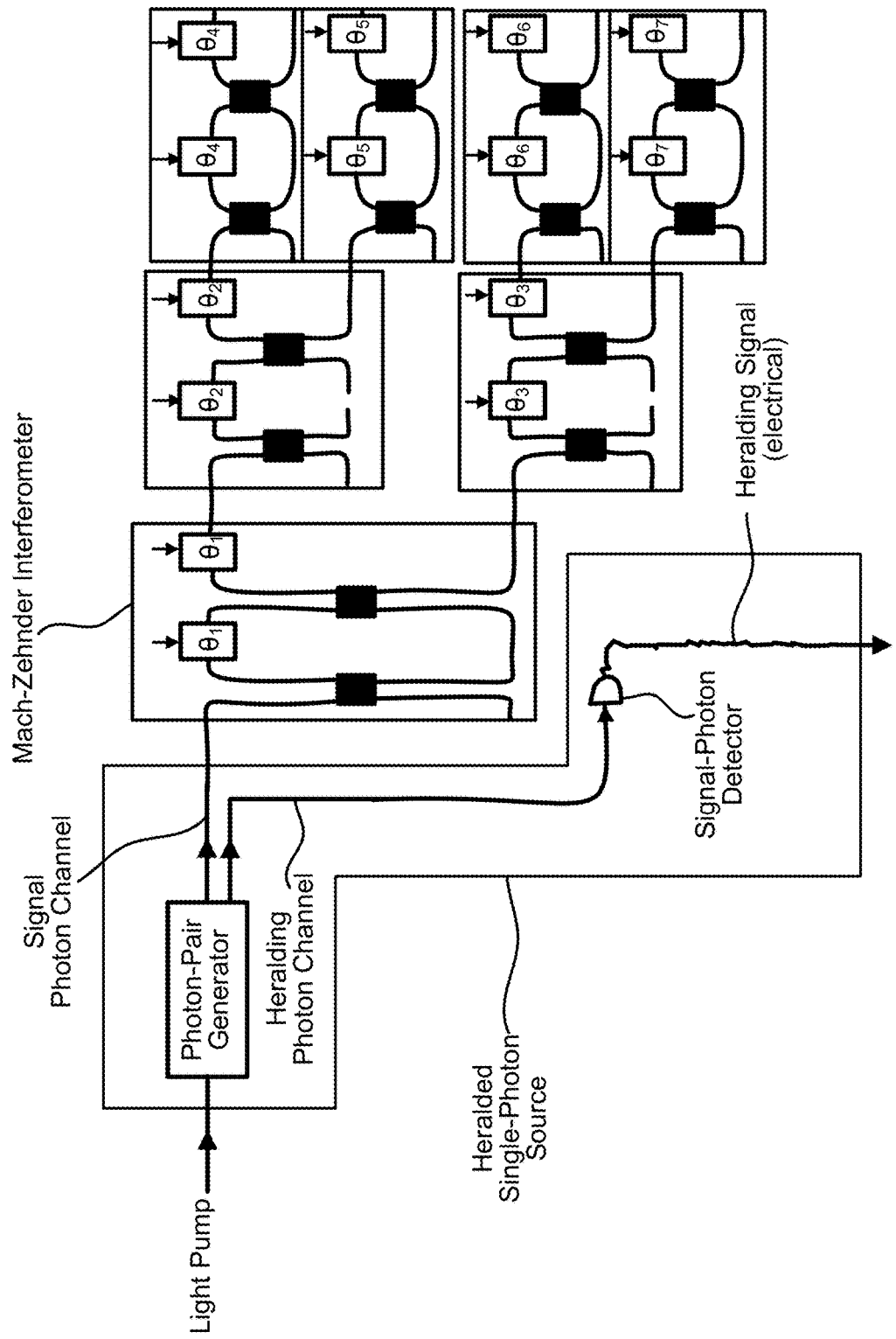
FIG. 14 illustrates a photonic-chip implementation of an 8-qubit quantum data loader using Mach-Zehnder Interferometers with additional phase compensation and a heralded single-photon source, according to an embodiment.

FIG. 14 shows an example implementation of the on-chip photonic quantum data loader in FIG. 12C. The example implementation includes a heralded single-photon source that creates an electrical signal when the quantum data loader succeeds in loading the classical data. Since the photon source is probabilistic, some fraction of the times when the quantum data loader is instructed to load the classical data, it may fail to do so because a photon is not produced. Heralding allows one to repeat until a photon is produced. The heralded source includes a light pump, a photon-pair generator, a signal photon channel, a heralding photon channel, a signal-photon detector. The light pump is typically a laser pulse that is used to provide optical energy to the photon-pair generator. The photon pair generator produces pairs of photons by converting a single photon from a pump pulse into two photons. To conserve energy, the energies of the two produced photons may at least sum to the energy of a single pump photon. The beam splitters in earlier figures are implemented in FIG. 14 with Mach-Zehnder Interferometers that each have an additional phase control ($\phi_i$) to compensate for possible manufacturing defects or tolerances.

Although FIGS. 12A-14 provide a photonic linear optics schemes that may be used as a quantum data loader, many alternative embodiments are possible, which follow the tree-structure connectivity.

Figure 15:
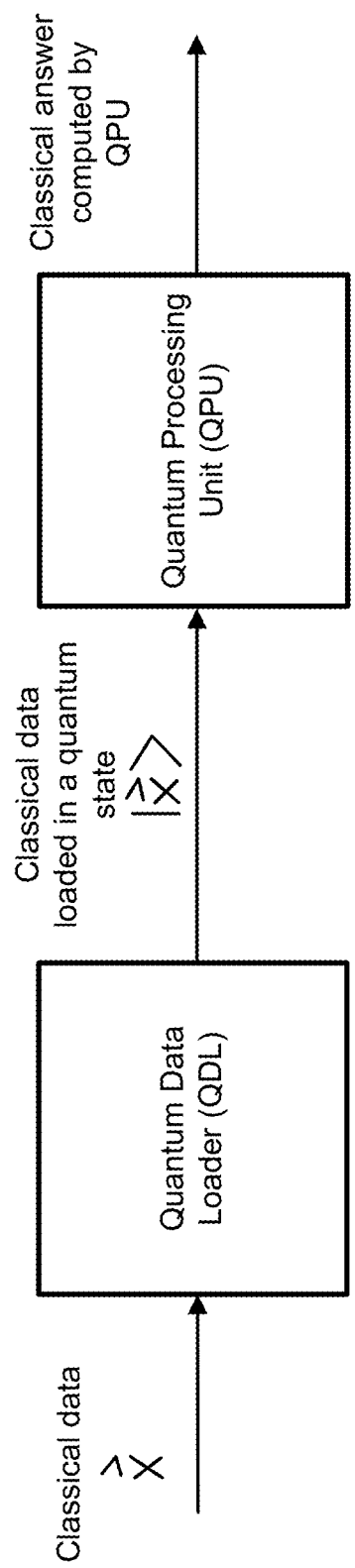
FIG. 15 illustrates a hybrid system in which a quantum data loader and another quantum processing unit are coupled together (e.g., implemented using different physical qubit technologies), according to an embodiment.

FIG. 15 illustrates a box diagram of a hybrid architecture in which a quantum data loader is built from a different quantum hardware platform than a quantum processing unit (QPU) (e.g., a universal quantum processing unit) that uses the loaded data. Any combination of hardware platforms can be used for the quantum data loader and the quantum processing device. Table 1 shows several different example combinations of quantum data loader and quantum processing device hardware platforms that may be advantageous. Advantageous combinations may have, but are not limited to, the following characteristics: the hardware platform of the quantum data loader has the advantage of being able to scale to a very large number of qubits (e.g., $10^6$) but the hardware platform may be disadvantages if it were used as a quantum processing device that processes the loaded data. For example, the hardware platform has poor error rates or a poor ability to control qubits. In contrast, the hardware platform of the quantum processing device may have the ability to provide universal gates and low error rates to allow for meaningful quantum computation operations. Provided a compression of the output quantum state of the quantum data loader from n qubits with unary (i.e., one-hot) encoding to a smaller number of qubits (e.g., $\log_2 n$ qubits with binary encoding) can be performed, the quantum processing device may have (e.g., exponentially) fewer qubits than the quantum data loader, and so the quantum processing device can be built from a low-error-rate hardware platform that does not have as many qubits as the quantum data loader.

TABLE 1

| Quantum Data Loader | Quantum Processing Unit |
| --- | --- |
| Photonic Qubits | Superconducting-circuit Qubits |
| Photonic Qubits | Trapped-ion Qubits |
| Photonic Qubits | Neutral-atom Qubits |
| Superconducting-circuit Qubits | Trapped-ion Qubits |
| Superconducting-circuit Qubits | Neutral-atom Qubits |
| Superconducting-circuit Qubits | Semiconductor-spin Qubits |
| Semiconductor-spin Qubits | Superconducting-circuit Qubits |
| Semiconductor-spin Qubits | Trapped-ion Qubits |
| Semiconductor-spin Qubits | Neutral-atom Qubits |

Figure 16:
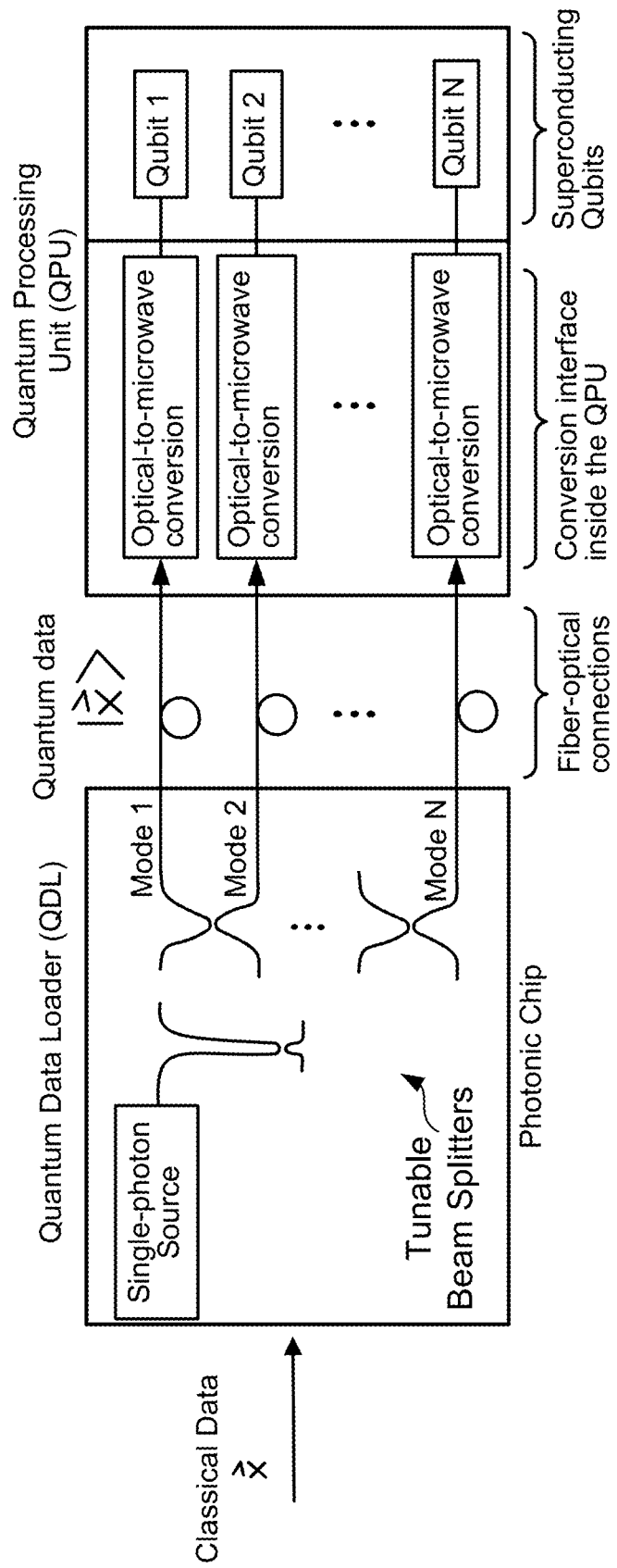
FIG. 16 illustrates a hybrid system in which a photonic-chip quantum data loader is interfaced with a superconducting-circuits quantum processing unit using optical-to-microwave converters on each qubit mode, according to an embodiment.

FIG. 16 shows a particular example of a hybrid quantum data loader-quantum processing device where the quantum data loader is constructed using photonic qubits, and the quantum processing device is constructed from superconducting-circuit qubits. An aspect of the design is that photonic qubits operate at optical frequencies (e.g., 200 THz) whereas superconducting-circuit qubits operate at microwave frequencies (e.g., 5 GHz), so an aspect of such a hybrid quantum data loader-quantum processing device design is a frequency-conversion stage between the quantum data loader and the quantum processing device. The conversion stage may include fiber-optical connections (e.g., fiber optic cables) and a conversion interface that includes optical-to-microwave converters. The conversion stage may be part of the quantum processing device. Many different types of quantum optical-to-microwave converters may be used at the frequency-conversion stage. Two more examples of hybrid quantum data loader-quantum processing device systems are: the quantum data loader is also constructed using photonic qubits and the quantum processing unit is made from either trapped-ion qubits or neutral-atom qubits. For these two examples, the systems could also have a construction similar to what is shown in FIG. 16, but where instead of optical-to-microwave conversion, there is an optical-to-optical conversion, which converts the wavelength of the photons (from the quantum data loader) from the wavelength emitted by the single-photon source (e.g., 1550 nm) to the wavelength that the ion or atom qubits can absorb (e.g., a wavelength<1000 nm).

Figure 17:
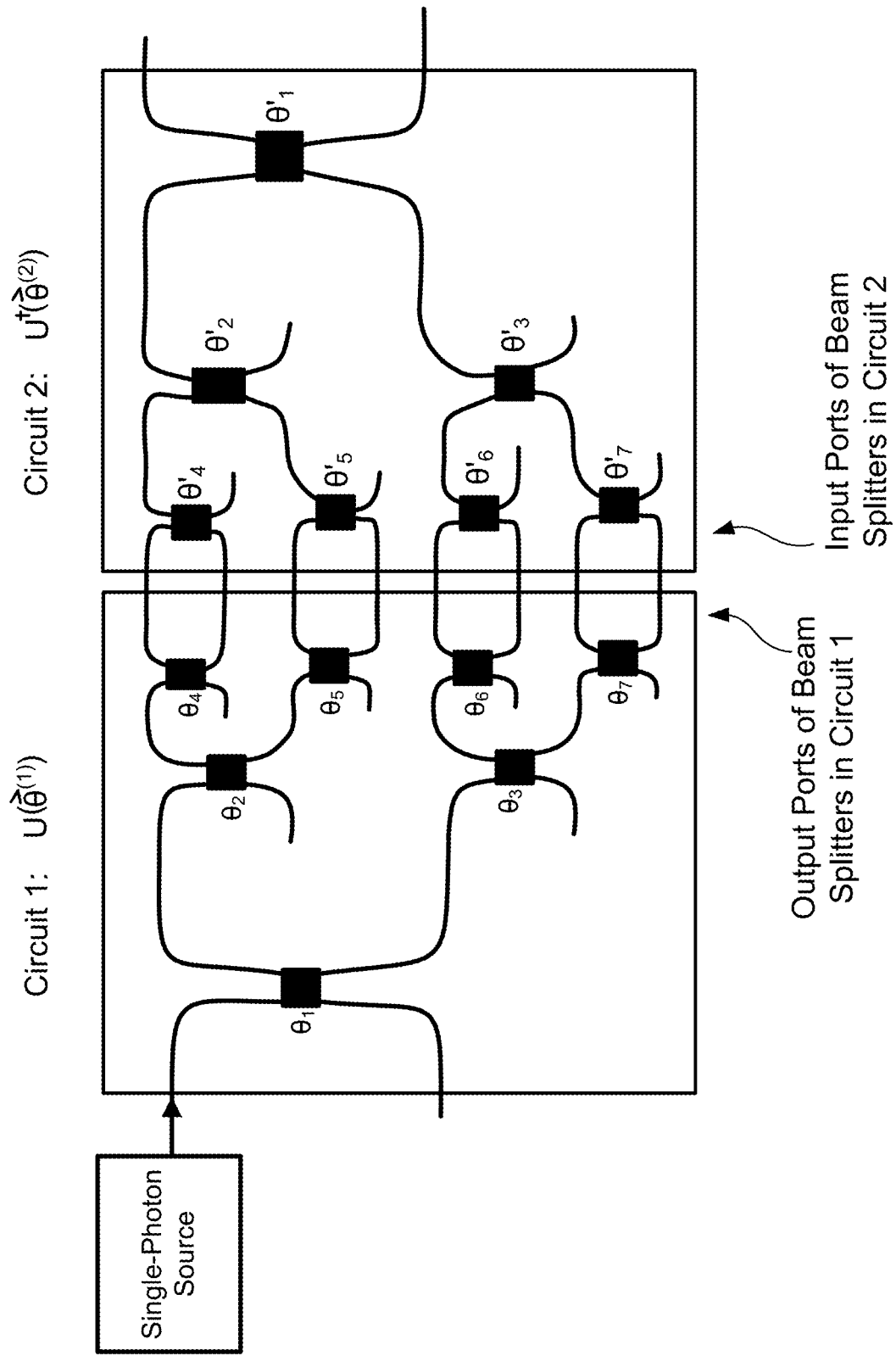
FIG. 17 illustrates a photonic-chip implementation of a vector-vector-dot-product computation formed from two quantum data loader photonic circuits.

Quantum data loaders can be used to realize vector-vector dot products in a very efficient manner that does not require universal gates. This can substantially reduce the qubit requirements for special-purpose quantum computers whose use is to perform vector-vector dot products with large classical vectors. FIG. 13 shows such an example special-purpose quantum computer, which comprises two quantum data loaders: one running forwards (circuit 1) with a single-photon source and parameters $\theta_i$ followed by one running backwards (circuit 2) with parameters $\theta'_i$. The beam splitters in circuit 1 implement a unitary operation $U(\theta^{(1)})$ while the beam splitters in circuit 2 implement the unitary operation $U^\dagger(\theta^{(2)})$. The beam splitters in circuit 2 are coupled according to a reverse binary tree. Thus, output ends of the binary tree pattern in circuit 1 are coupled to input ends of the reverse binary tree in circuit 2. The configuration of FIG. 17 may be able to execute the quantum circuit illustrated in FIG. 3. The design in this figure is for photonic-qubit-based quantum data loaders, but this design idea may be readily adapted to other physical qubit hardware platforms.

ADDITIONAL CONSIDERATIONS

A quantum processing device (also referred to as a quantum computer, quantum processor, or quantum processing unit) exploits the laws of quantum mechanics in order to perform computations. A quantum processing device can be a universal or a non-universal quantum processing device (a universal quantum device can execute any possible quantum circuit (subject to the constraint that the circuit doesn't use more qubits than the quantum device possesses)). Quantum processing devices commonly use so-called qubits, or quantum bits. While a classical bit always has a value of either 0 or 1, a qubit is a quantum mechanical system that can have a value of 0, 1, or a superposition of both values. Example physical implementations of qubits include superconducting qubits, spin qubits, trapped ions, arrays of neutral atoms, and photonic systems (e.g., photons in waveguides). For the purposes of this disclosure, a qubit may be realized by a single physical qubit or as an error-protected logical qubit that itself comprises multiple physical qubits. The disclosure is also not specific to qubits. The disclosure may be generalized to apply to quantum processors whose building blocks are qudits (d-level quantum systems, where d>2) or quantum continuous variables, rather than qubits.

A quantum circuit is an ordered collection of one or more gates. A sub-circuit may refer to a circuit that is a part of a larger circuit. A gate represents a unitary operation performed on one or more qubits. Quantum gates may be described using unitary matrices. The depth of a quantum circuit is the least number of steps needed to execute the circuit on a quantum computer. The depth of a quantum circuit may be smaller than the total number of gates because gates acting on non-overlapping subsets of qubits may be executed in parallel. A layer of a quantum circuit may refer to a step of the circuit, during which multiple gates may be executed in parallel. In some embodiments, a quantum circuit is executed by a quantum computer. In this sense a quantum circuit can be thought of as comprising a set of instructions or operations that a quantum computer should execute. To execute a quantum circuit on a quantum computer, a user may inform the quantum computer what circuit is to be executed. A quantum computer may include both a core quantum device and a classical peripheral/control device that is used to orchestrate the control of the quantum device. It is to this classical control device that the description of a quantum circuit may be sent when one seeks to have a quantum computer execute a circuit.

A variational quantum circuit may refer to a parameterized quantum circuit that is executed many times, where each time some of the parameter values may be varied. The parameters of a parameterized quantum circuit may refer to parameters of the gate unitary matrices. For example, a gate that performs a rotation about the y axis may be parameterized by a real number that describes the angle of the rotation. Variational quantum algorithms are a class of hybrid quantum-classical algorithm in which a classical computer is used to choose and vary the parameters of a variational quantum circuit. Typically, the classical processor updates the variational parameters based on the outcomes of measurements of previous executions of the parameterized circuit.

The description of a quantum circuit to be executed on one or more quantum computers may be stored in a non-transitory computer-readable storage medium. The term "computer-readable storage medium" should be taken to include a single medium or multiple media (e.g., a centralized or distributed database, or associated caches and servers) able to store instructions. The term "computer-readable medium" shall also be taken to include any medium that is capable of storing instructions for execution by the quantum computer and that cause the quantum computer to perform any one or more of the methodologies disclosed herein. The term "computer-readable medium" includes, but is not limited to, data repositories in the form of solid-state memories, optical media, and magnetic media.

The approaches described above may be amenable to a cloud quantum computing system, where quantum computing is provided as a shared service to separate users. One example is described in patent application Ser. No. 15/446,973, "Quantum Computing as a Service," which is incorporated herein by reference.

Some portions of above description describe the embodiments in terms of algorithmic processes or operations. These algorithmic descriptions and representations are commonly used by those skilled in the computing arts to convey the substance of their work effectively to others skilled in the art. These operations, while described functionally, computationally, or logically, are understood to be implemented by computer programs comprising instructions for execution by a processor or equivalent electrical circuits, microcode, or the like. Furthermore, it has also proven convenient at times, to refer to these arrangements of functional operations as modules, without loss of generality. In some cases, a module can be implemented in hardware, firmware, or software.

As used herein, any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment. Similarly, use of "a" or "an" preceding an element or component is done merely for convenience. This description should be understood to mean that one or more of the element or component is present unless it is obvious that it is meant otherwise.

Alternative embodiments are implemented in computer hardware, firmware, software, and/or combinations thereof. Implementations can be implemented in a computer program product tangibly embodied in a machine-readable storage device for execution by a programmable processor; and method steps can be performed by a programmable processor executing a program of instructions to perform functions by operating on input data and generating output. As used herein, 'processor' may refer to one or more processors. Embodiments can be implemented advantageously in one or more computer programs that are executable on a programmable system including at least one programmable processor coupled to receive data and instructions from, and to transmit data and instructions to, a data storage system, at least one input device, and at least one output device. Each computer program can be implemented in a high-level procedural or object-oriented programming language, or in assembly or machine language if desired; and in any case, the language can be a compiled or interpreted language. Suitable processors include, by way of example, both general and special purpose microprocessors. Generally, a processor will receive instructions and data from a read-only memory and/or a random-access memory. Generally, a computer will include one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM disks. Any of the foregoing can be supplemented by, or incorporated in, ASICs (application-specific integrated circuits) and other forms of hardware.

Although the above description contains many specifics, these should not be construed as limiting the scope of the invention but merely as illustrating different examples. It should be appreciated that the scope of the disclosure includes other embodiments not discussed in detail above. Various other modifications, changes, and variations which will be apparent to those skilled in the art may be made in the arrangement, operation, and details of the methods and apparatuses disclosed herein without departing from the spirit and scope of the invention.

What is claimed is:

1. A quantum data loader configured to encode an n-dimensional vector representing classical data into a quantum state, the quantum data loader comprising:
   n−1 tunable beam splitters coupled together according to a binary tree pattern, each beam splitter having a tunable parameter that affects a ratio of reflectance versus transmittance; and
   a single photon source coupled to a root node tunable beam splitter, the single photon source configured to inject a photon into the root node tunable beam splitter.

2. The quantum data loader of claim 1, wherein the tunable parameters are tuned based on the n-dimensional vector so that an output quantum state of the quantum data loader encodes the n-dimensional vector representing the classical data.

3. The quantum data loader of claim 1, wherein a tunable beam splitter of the n−1 tunable beam splitters is configured to implement a BS quantum gate, the BS quantum gate being a parametrized two-qubit gate, wherein the tunable parameter value of the tunable beam splitter corresponds to a parameter of the parametrized two-qubit gate.

4. The quantum data loader of claim 1, wherein the binary tree pattern comprises:
   the root node tunable beam splitter comprising a first output port and a second output port;
   a second tunable beam splitter with an input port coupled to the first output port of the root node tunable beam splitter;
   a third tunable beam splitter with an input port coupled to the second output port of the root node tunable beam splitter;
   a fourth tunable beam splitter with an input port coupled to a first output port of the second tunable beam splitter; and
   a fifth tunable beam splitter with an input port coupled to a second output port of the second tunable beam splitter.

5. The quantum data loader of claim 1, wherein the single photon source is a heralded single-photon source.

6. The quantum data loader of claim 1, wherein a tunable beam splitter of the n−1 tunable beam splitters is a Zehnder-Interferometer.

7. The quantum data loader of claim 6, wherein the Zehnder-Interferometer comprises two fixed-ratio beam splitters and a tunable phase shifter.

8. The quantum data loader of claim 7, wherein the tunable phase shifter is a thermo-optic-mechanical-system phase shifter, a micro-electro-mechanical-system (MEMS) phase shifter, or an electro-optic phase shifter.

9. The quantum data loader of claim 7, wherein the Zehnder-Interferometer further comprises a phase controller.

10. The quantum data loader of claim 1, wherein the quantum data loader is coupled to a quantum processing unit comprising a set of qubits.

11. The quantum data loader of claim 10, wherein the quantum processing unit does not include tunable beam splitters.

12. The quantum data loader of claim 10, wherein the set of qubits of the quantum processing unit includes superconducting-circuit qubits, trapped-ion qubits, or neutral-atom qubits.

13. The quantum data loader of claim 10, wherein the quantum data loader is coupled to the quantum processing unit via a conversion stage.

14. The quantum data loader of claim 13, wherein the conversion stage includes fiber optic cables that couple one or more of the n−1 tunable beam splitters to a conversion interface of the quantum processing unit.

15. The quantum data loader of claim 14, wherein the conversion interface includes optical-to-microwave converters.

16. The quantum data loader of claim 1, wherein the quantum data loader is coupled to a second quantum data loader.

17. The quantum data loader of claim 16, wherein the second quantum data loader comprises n−1 tunable beam splitters coupled together according to a reverse binary tree pattern.

18. The quantum data loader of claim 17, wherein a subset of output ports of beam splitters in the binary tree pattern are coupled to a subset of input ports of beam splitters in the reverse binary tree pattern.

* * * * *